(12) United States Patent
Schnoebelen et al.

(10) Patent No.: US 7,286,258 B2
(45) Date of Patent: Oct. 23, 2007

(54) DECORATING SYSTEM FOR EDIBLE PRODUCTS

(75) Inventors: Andy Schnoebelen, Escondido, CA (US); Marc Schnoebelen, Escondido, CA (US); Jeff Barkhimer, Escondido, CA (US); Matt Bullen, Oceanside, CA (US); Mark McLoughlin, Santa Ana, CA (US); Mary Sandquist, St. Paul, MN (US); Stephen L. Spurgeon, Boulder, CO (US); Ronald B. Kammerer, Jr., Boulder, CO (US)

(73) Assignee: DecoPac, Inc., Anoka, MN (US)

( * ) Notice: Subject to any disclaimer, the term of this patent is extended or adjusted under 35 U.S.C. 154(b) by 615 days.

(21) Appl. No.: 10/804,839

(22) Filed: Mar. 19, 2004

(65) Prior Publication Data

US 2005/0088693 A1 Apr. 28, 2005

Related U.S. Application Data

(63) Continuation-in-part of application No. 10/058,629, filed on Jan. 28, 2002, now Pat. No. 6,903,841, which is a continuation of application No. 09/144,046, filed on Aug. 31, 1998, now abandoned.

(60) Provisional application No. 60/079,335, filed on Mar. 25, 1998.

(51) Int. Cl.
*G06K 15/00* (2006.01)
*A23G 3/26* (2006.01)
*B05C 11/11* (2006.01)
*C09D 11/00* (2006.01)

(52) U.S. Cl. .................... 358/1.18; 106/31.13; 118/16; 118/29

(58) Field of Classification Search ............... 358/1.18; 426/104, 112, 383; 106/31.13, 31.6, 31.68, 106/31.75, 31.86, 31.74, 31.69; 118/14, 118/13, 24, 16, 29
See application file for complete search history.

(56) References Cited

U.S. PATENT DOCUMENTS 919,736 A 4/1909 Loesch
(Continued)

FOREIGN PATENT DOCUMENTS

GB 161740 4/1921
(Continued)

OTHER PUBLICATIONS

*Decorating System PhotoCake II User Guide*, Jul. 2002, Vivid Image Technology, 38 pages.
(Continued)

*Primary Examiner*—Jerome Grant, II
(74) *Attorney, Agent, or Firm*—Fish & Richardson P.C.

(57) ABSTRACT

A system for creating a decorative edible item from a selected image. The system includes at least one image source, such as a scanner and/or a library of stored images, a controller unit and a printer. An edible media is inserted into the printer. The user then selects the image source, such as the scanner for scanning in a photograph reminiscence of a person or event being honored. The size of the printed image is then selected as well as the number of copies to be printed from the image. The print sequence is then activated. The controller unit applies color correction to the digital image and converts the digital image into printer control signals to operate the printer. The printer then prints a rendition of the image with edible inks as the edible media travels through the printer. A high-quality pictorial rendition of the image is thus created. The printed edible media can then be applied onto a product, shipped to a separate location or eaten as is.

16 Claims, 24 Drawing Sheets

U.S. PATENT DOCUMENTS

| | | |
|---|---|---|
| 1,605,903 A | 11/1926 | Schuler |
| 2,123,215 A | 7/1938 | Thomas |
| 2,347,022 A | 4/1944 | Austin |
| 2,353,594 A | 7/1944 | Seagren |
| 2,394,322 A | 2/1946 | McKee |
| 2,526,811 A | 10/1950 | Dawson |
| 2,578,150 A | 12/1951 | Rathke |
| 2,610,588 A | 9/1952 | Seagren et al. |
| 2,895,832 A | 7/1959 | Bersey |
| 3,057,730 A | 10/1962 | Morck |
| 3,192,086 A | 6/1965 | Gyurk |
| 3,649,347 A | 3/1972 | Battista |
| 3,654,894 A | 4/1972 | Rohrbacher et al. |
| 3,658,977 A | 4/1972 | Baker |
| 3,776,185 A | 12/1973 | Kawasaki |
| 3,852,494 A | 12/1974 | Williamson |
| 4,024,287 A | 5/1977 | Golchert |
| 4,061,783 A | 12/1977 | Hoffman et al. |
| 4,168,662 A | 9/1979 | Fell |
| 4,285,978 A | 8/1981 | Quinlivan |
| 4,292,917 A | 10/1981 | Ezaki |
| 4,388,862 A | 6/1983 | Thomas, Jr. |
| 4,409,893 A | 10/1983 | Newman et al. |
| 4,455,320 A | 6/1984 | Syrmis |
| 4,466,994 A | 8/1984 | Hubbard et al. |
| 4,531,292 A | 7/1985 | Pasternak |
| 4,537,647 A | 8/1985 | Foster |
| 4,548,825 A | 10/1985 | Voss et al. |
| 4,560,562 A | 12/1985 | Shroeder |
| 4,578,273 A | 3/1986 | Krubert |
| 4,592,916 A | 6/1986 | Akesson |
| 4,668,521 A | 5/1987 | Newsteder |
| 4,668,523 A | 5/1987 | Begleiter |
| 4,670,271 A | 6/1987 | Pasternak |
| 4,785,313 A | 11/1988 | Higuma et al. |
| 4,832,966 A | 5/1989 | Newsteder |
| 4,843,958 A | 7/1989 | Egosi |
| 4,910,661 A | 3/1990 | Barth et al. |
| 4,985,260 A | 1/1991 | Niaura et al. |
| 5,006,362 A | 4/1991 | Hilborn |
| 5,017,394 A | 5/1991 | Macpherson et al. |
| 5,032,416 A | 7/1991 | Niaura et al. |
| 5,035,907 A | 7/1991 | Phillips et al. |
| 5,081,917 A | 1/1992 | Masuda |
| 5,255,352 A | 10/1993 | Falk |
| 5,334,404 A | 8/1994 | Garcia et al. |
| 5,485,189 A | 1/1996 | Ebata |
| 5,505,775 A * | 4/1996 | Kitos .......................... 118/14 |
| 5,547,507 A | 8/1996 | Ciaramita |
| 5,711,791 A | 1/1998 | Croker et al. |
| 5,795,395 A | 8/1998 | Ben-Matitavhu et al. |
| 5,834,047 A | 11/1998 | Ahn |
| 5,895,682 A | 4/1999 | Tsukioka |
| 6,045,220 A | 4/2000 | Kiyohara et al. |
| 6,058,843 A | 5/2000 | Young |
| 2001/0012529 A1 * | 8/2001 | Genevieve ................. 426/104 |
| 2002/0047867 A1 * | 4/2002 | Mault et al. ................ 345/810 |
| 2002/0049638 A1 * | 4/2002 | Ito ............................. 705/26 |
| 2002/0109600 A1 * | 8/2002 | Mault et al. ............. 340/573.1 |
| 2002/0152927 A1 * | 10/2002 | Russell et al. ........... 106/31.13 |

FOREIGN PATENT DOCUMENTS

| | | |
|---|---|---|
| GB | 196885 | 3/1924 |
| GB | 422430 | 1/1935 |
| GB | 543427 | 2/1942 |
| GB | 628886 | 9/1949 |
| GB | 786428 | 11/1957 |
| JP | 59-118049 | 7/1984 |
| JP | 60-126057 | 7/1985 |
| JP | 2-163058 | 6/1990 |
| WO | WO 95/01735 | 1/1995 |
| WO | WO 97/27759 | 8/1997 |

OTHER PUBLICATIONS

*Cake Decorating System PhotoCake User's Guide*, 2000, Vivid Image Technology, 66 pages.

"Computerized Edible Imaging Solutions Features Comparison," CTP Imaging Solutions at http://www.caketoppub.com/comparisons.htm, printed from the internet on Mar. 9, 2004, 2 pages.

Geller-Shinn, "Tools of the Trade: Yum! The Edible Image is Served," Photographic, Sep. 1988, 1 page article.

Massaro, "Enterprise Stirs Up Picture-Perfect Cakes," Rocky Mountain News, Oct. 14, 1998, 1 page article.

\* cited by examiner

 ITEM 101
 ITEM 102
 ITEM 103
 ITEM 104
 ITEM 105
 ITEM 106
 ITEM 107
 ITEM 108
 ITEM 109
 ITEM 110
 ITEM 111
 ITEM 112
 ITEM 113
 ITEM 114
 ITEM 115
 ITEM 116
 ITEM 117
 ITEM 118
 ITEM 119
 ITEM 112
 ITEM 121
 ITEM 122
 ITEM 123
 ITEM 124
 ITEM 127
 ITEM 128
 ITEM 129
 ITEM 130
 ITEM 131
 ITEM 133
 ITEM 134
 ITEM 135
 ITEM 136
 ITEM 137
 ITEM 138
 ITEM 139
Figure 2

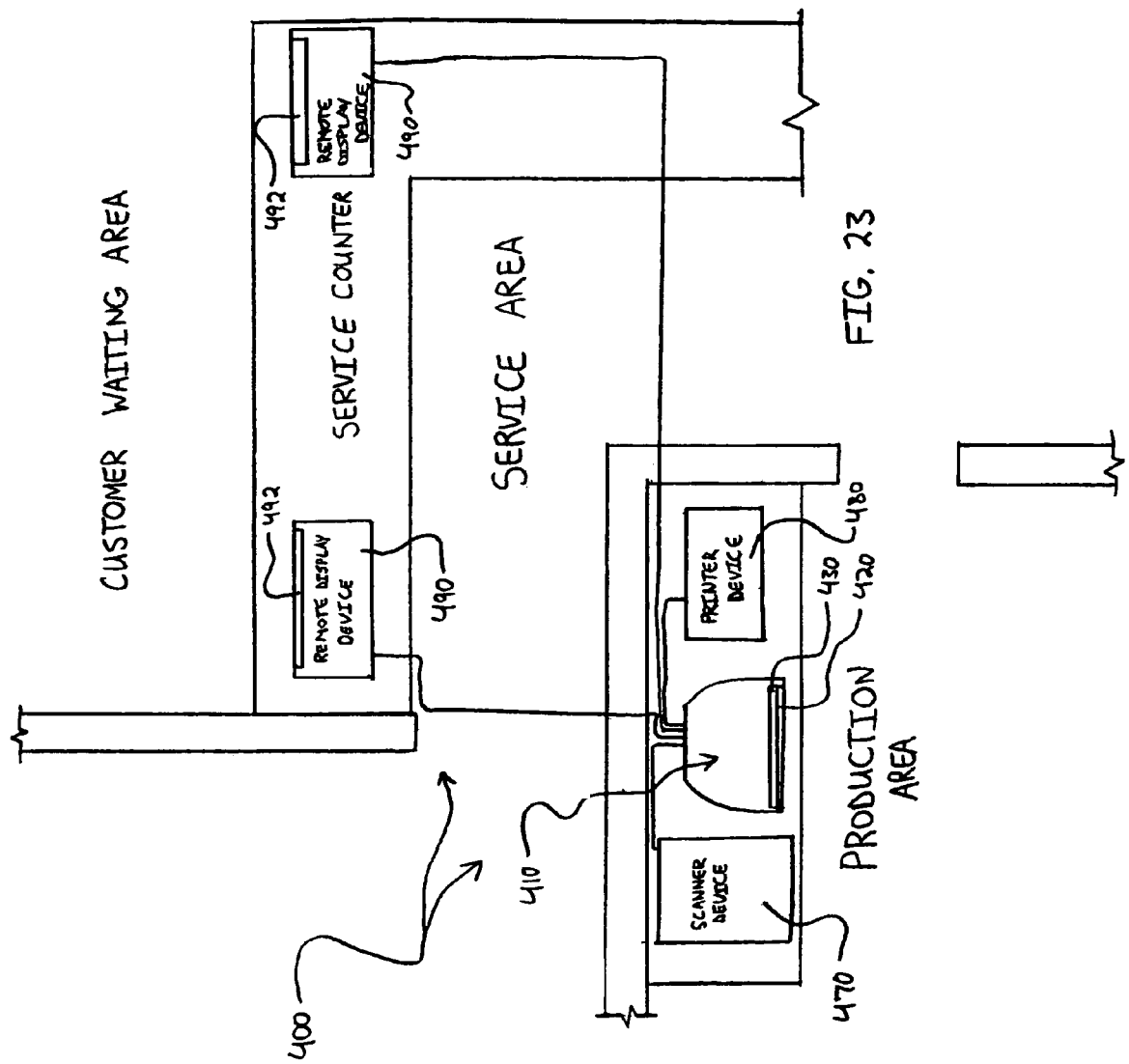

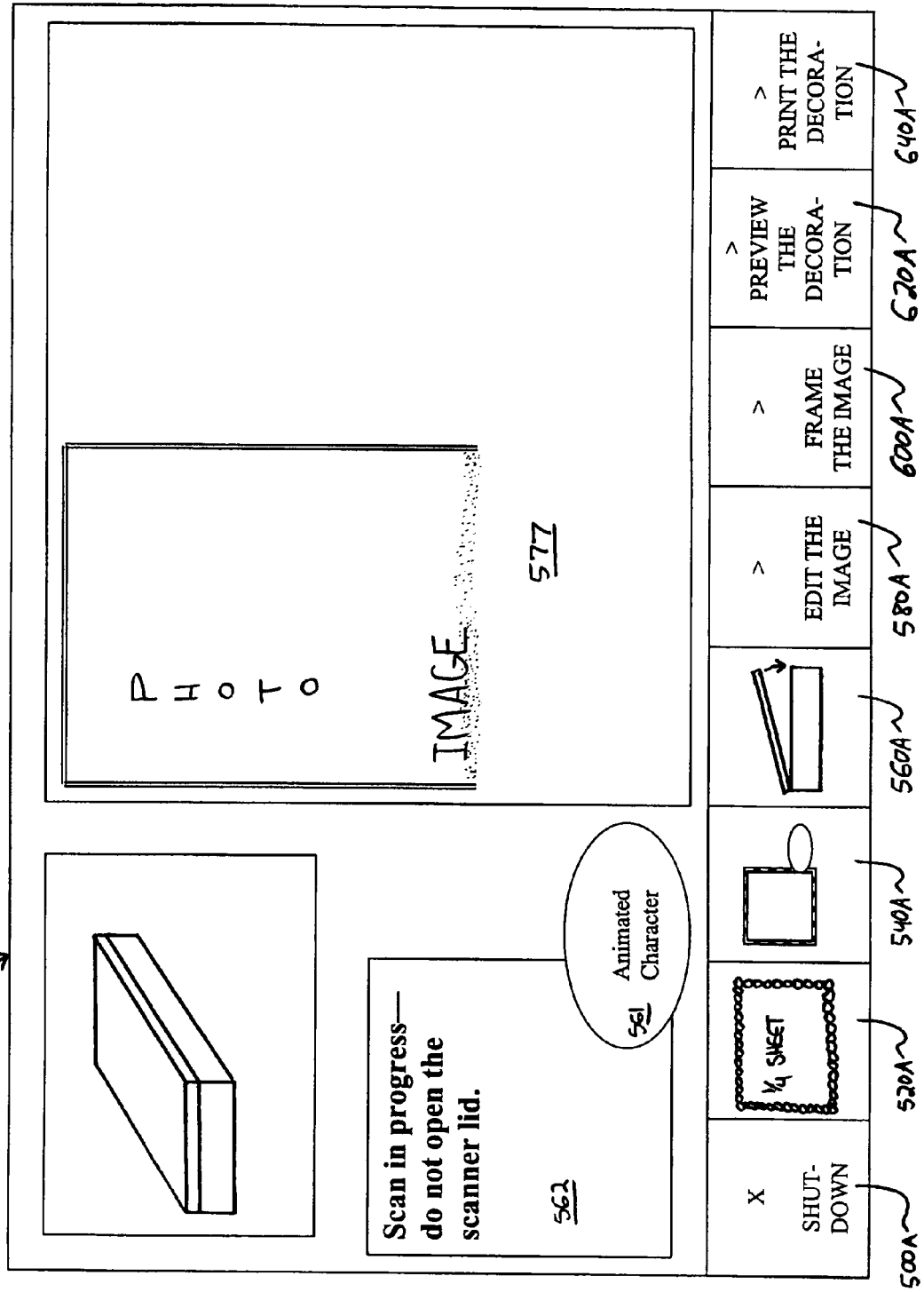

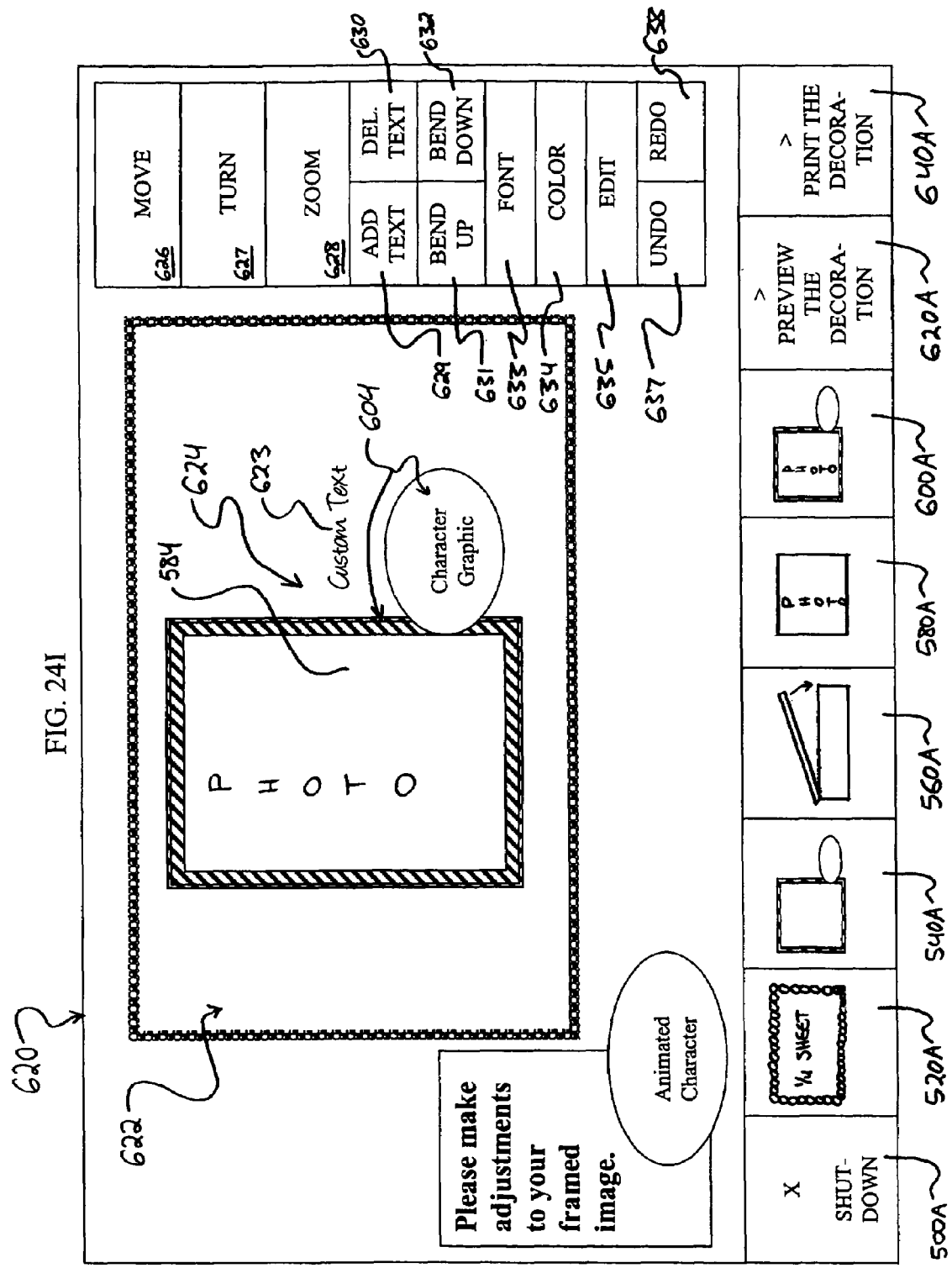

DECORATING SYSTEM FOR EDIBLE PRODUCTS

CROSS-REFERENCE TO RELATED APPLICATIONS

This is a continuation-in-part of U.S. patent application Ser. No. 10/058,629 entitled "Decorating System for Edible Items" filed on Jan. 28, 2002 by Spurgeon et al., now U.S. Pat. No. 6,903,841 which is a continuation of U.S. patent application Ser. No. 09/144,046 filed on Aug. 31, 1998, now abandoned, which claims priority to U.S. Provisional Application Ser. No. 60/079,335 filed on Mar. 25, 1998.

TECHNICAL FIELD

This invention relates to the field of digital imaging on edible items.

BACKGROUND

Decorative food products, such as cakes, are popular items, particularly for special occasions, such as birthdays, holidays, weddings, anniversaries and other celebratory events. These items are typically purchased from bakeries, since they require some skill and/or apparatus to create. Previously, these items were created from colored frostings applied manually by trained bakery chefs. The creation of these hand-decorated items were time and labor intensive. Normally a customer will either buy a stock item from the bakery or else place an order for a special item then return to pick the order up at a later date. These manually created items are at best a stylized rendition of the desired image and limited by the skill of the baker.

There have been a number of attempts previously to provide alternatives to the manually created decorating process. One such alternative that is presently widely used is the use of pre-made decorative items which are then placed on the food product. These pre-made items are produced in bulk and inventoried until use. The use of such pre-made decorative items precludes uniquely decorated and/or personalized decorations. Also, these pre-made decorative items must be either ordered, which requires a long lead time, or stored in inventory at the risk of under ordering or over ordering, as well as the cost of such inventory. Another alternative has been to utilize an automated system for decorating cakes.

One example of such a system is disclosed in U.S. Pat. No. 4,910,661, issued to Barth et al. This system uses a video system to create an image, which is then applied to the cake by controlled movement of an X-Y table beneath a set of spray nozzles which dispense colored liquid onto the cake. This system is cumbersome and complicated and requires operator intervention.

One other system is disclosed in U.S. Pat. No. 4,578,273, issued to Krubert. This system uses a series of stations through which the food product is conveyed. At one station, a series of colored images are stamped onto the food product to form an image. This process is geared toward mass production of products having identical images since the stamps are formed in a single image. The stamps must be changed in order to create another image.

Another prior attempt is disclosed in U.S. Pat. No. 5,505,775, issued to Kitos. This system utilizes an integrated work surface controlled with a computer system. An image is scanned into the computer system. The computer system then uses a motion control system to manipulate a drop on demand colorant expulsion system over a cake carried on the work surface to reproduce the scanned image. This system requires a flat surface on the top of the cake since it is incapable of vertical axis movement. The choice of colors is limited to the three-color single cartridge colorant expulsion system.

These systems also produce the decorations and images directly onto the food product. Since these food products are produced at the bakery, the decorated food product must then be transported to the event. Many times the decorated food product is damaged in transit. Also, this increases the expense many times in transporting the entire decorated food product.

None of these systems are truly capable of providing an on-demand system that can create a near-photographic reproduction of an image in an edible format. There is a need for such a system.

SUMMARY

The present invention solves this and other problems by providing a process and a system for creating an edible product from a selected image in an "on demand" system. The product is fully edible and can be applied onto a cake or other food product at the time of creation, easily transported to another location for application or eaten as is.

The system of one preferred embodiment of the present invention includes at least one image source for selection of a desired image, a controller unit for receiving the selected image and a printer for printing the selected image as received from the controller unit onto an edible media with edible inks. The system is designed to be easily used without the need of extensive training or computer skills. The system is also designed to be flexible in the capability of accommodating various sizes of edible media and in the source of the images.

An edible media is first inserted into the printer of the system. This edible media is specially formulated not only be able to render a high quality pictorial rendition of a selected image on the application of specially formulated edible inks, but must be able to travel along a media path in the printer itself without damage. This media path normally includes the bending of the edible media along with friction rollers. Once the edible media has been inserted into the printer path, then the controller unit is used to operate the system.

The controller unit, in a preferred embodiment of the present invention, can be a separate computer system, an enclosed processor or any other type of digital processing unit. In the preferred embodiment, the controller unit uses a touch screen interface. A variety of menus which are accessed by this touch screen interface allows the system to be easily operated. Once the edible media has been inserted into the printer, the user must first select an image source. Multiple image sources are provided in the preferred embodiment. The first image source, in the preferred embodiment of the invention, is a scanner. The user can insert a personal photograph, such as of a person or event being honored, onto the scanner. The photograph is then scanned and the digital image transmitted to the controller unit. A second image source in the preferred embodiment is a library of images stored in the controller unit or on external storage devices. The user selects an image from a catalog and inputs this selection by way of the touch screen interface into the controller unit. If that selected image is available, then the controller unit verifies the selection. Other image sources include any available digital image source, or even analog sources which are then converted to digital images. Examples of such digital image source include without limitation: film/slide scanners, digital cameras, digital videos, networked image libraries, digital tablets, external storage devices such as floppy disks, Zip drives, superdrives, cd-rom or other sources of digital data.

The user can then select the size of the printed image from a preset selection or else selects a custom size. The number of copies to be printed is also selected. A single image may be printed on multiple media, multiple copies can be repeated onto a single media (such as for use on cupcakes), images can be "tiled" onto multiple media to form a larger image or multiple separate images can be printed onto a single media. Also, separate images can be overlayed onto one another for additional effect. Cutting or cropping software can also be incorporated therein to manipulate the image. Once the image source, the printed image size and the number of copies have been selected, the user then activates the print mode to either scan the photograph, retrieve the stored image or otherwise obtain the digital data from the selected image source.

The controller unit then performs color correction on the digital data from the image source and converts this processed data into printer control signals. These signals operate the printer to transport the edible media along the printer media path and adjacent the printheads of the printer. The printer prints a rendition of the image onto the edible media with edible inks.

The edible inks have been specially formulated for use in the printer, which in the preferred embodiment, is an inkjet printer. The edible inks are also formulated in cyan, magenta, yellow and black to faithfully render images as percentages of these colors in accordance with the CMYK color model. The system can also use other color models as well, including without limitation RGB, LAB, HSB, Pantone, Hexachrome and other color models. This improves the precision of the printed image by providing adherence to color matching systems.

The printer, in the preferred embodiment of the invention, includes most, if not all, types of inkjet printers. These include thermal inkjet, solid piezo inkjet, liquid piezo inkjet, continuous inkjets, valve inkjets, electrostatic inkjets and airbrush print technology. Other types of printers are usable as well as long as the accurate color matching of the edible inks are attainable.

Once the edible media has traveled through the printer and the image printed thereon with the edible inks, the printed edible media can be removed from the printer. The printed edible media can then be placed on a food product at the point of printing, transported to a separate location for application or even consumed as is. The system is flexible in its capability to print different sizes depending on the food product to be decorated. Also, since the edible media is relatively thin and sturdy, it can be transported separately from the food product to minimize damage to the decorations. The system is also designed to be easily updated and for its settings to be easily adjusted.

The system can be used in a bakery environment as a stand-alone system or used in a network, such as a LAN, WAN, MAN, Intranet or even an Internet system. For instance, a controller unit with the image sources can be set up on a kiosk. A user can input or select their desired image, choose the correct settings and activate the system. Once the image is scanned or retrieved, the user may leave. The controller unit processes the information and transmits the information to a remote site, such as a central bakery. The finished media is either applied onto a product and shipped to the user, or else shipped by itself to the user. Another variation includes an Internet web site where the user can either upload their image or select from an image library. The user would then also make the other selections relative to the media size, copies and the like. This information would then be transmitted to the printer, which could be at any location, and then the printed media shipped to the user.

The unique and specially formulated edible media and edible inks allow commercially available print systems to be utilized. The previous decorative systems require specially designed print systems. Also, the present system is truly an "on-demand" system. The printed image on the edible media can be created in a mere few minutes. Also, the printed image can be rendered from almost any photograph or digitally created or converted image into a near photographic quality edible image.

In another embodiment, a system for decorating an edible substrate may include a primary housing that contains a processing unit and a memory unit. A scanner may be coupled to the processing unit such that the scanner is operable to scan an image and transmit the image to the processing unit. A printer device may be coupled to the processing unit and be capable of printing the image onto an edible substrate. A first display device and a second display device may also be coupled to the processing unit. The second display device may be capable of being remotely positioned relative to the primary housing and be operable to display at least a portion of the image displayed on the first display device. In a further aspect, the system may include a third display device coupled to the processing unit. The third display device may be capable of being remotely positioned relative to the primary housing and displaying at least a portion of the image displayed on the first display device.

These and other features are described in greater detail in the ensuing description of a preferred embodiment and in the drawings.

DESCRIPTION OF DRAWINGS

FIG. 2 is an illustration of a catalog of Digital Art images;

FIG. 23 is diagram of the decorating system of FIG. 21 in a service environment;

FIGS. 24A-J illustrate various display screens shown to a user of the decorating system of FIG. 21;

Like reference symbols in the various drawings indicate like elements.

DETAILED DESCRIPTION

Referring in more detail to the drawings, as shown in FIGS. 1-20, a preferred embodiment of the present invention is described. In this particular preferred embodiment a system 10 for creating an edible product from a selected image is illustrated. It is to be clearly understood that this preferred embodiment is provided for descriptive purposes only and is not meant to unduly limit the scope of the inventive concept. Other embodiments are included within the inventive concept as set forth in the appended claims.

System Overview

Figure 1:
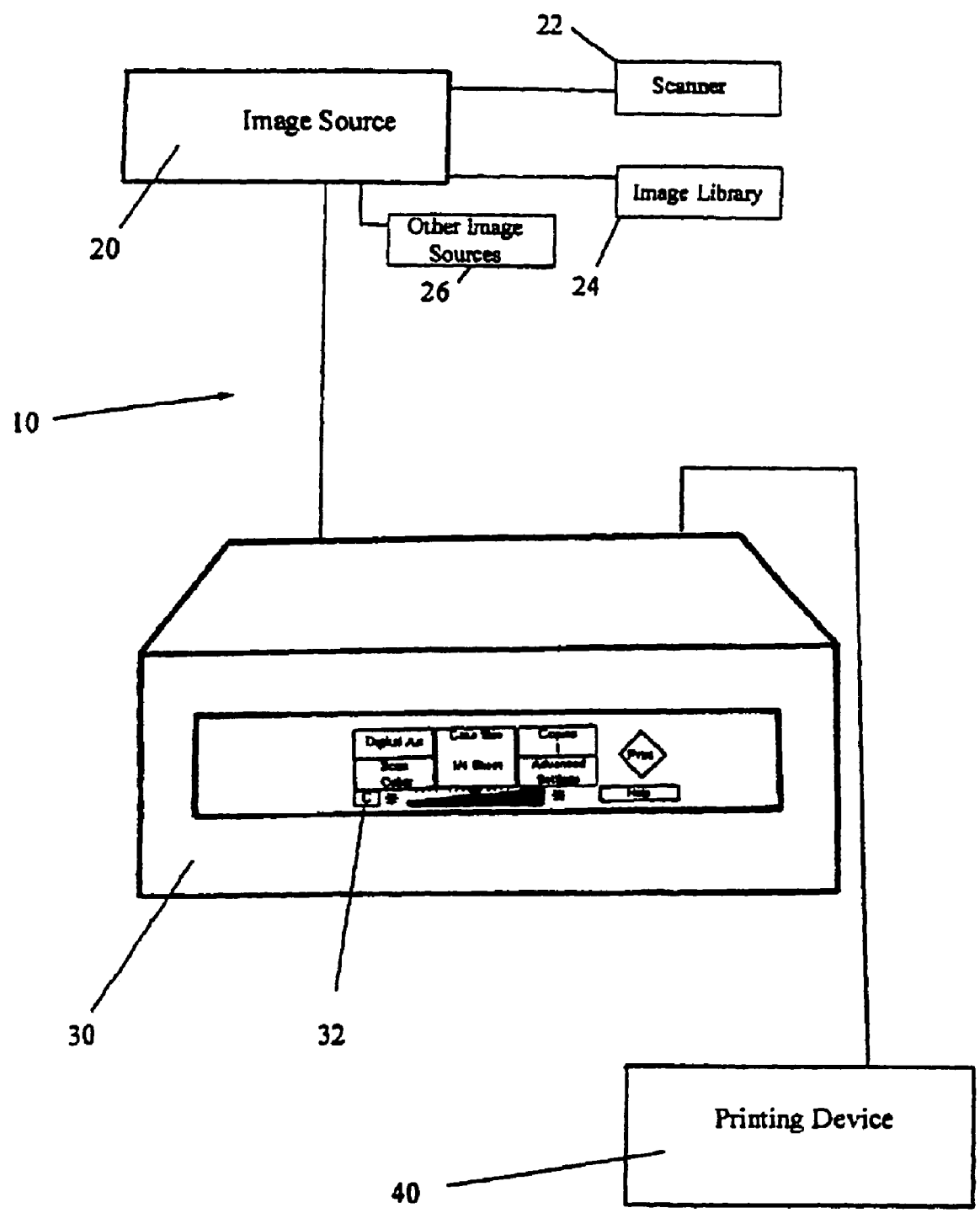
FIG. 1 is a schematic of a preferred embodiment of the decoration system of the present invention.

The system 10 of the present invention, as illustrated in FIG. 1 includes at least one image source 20, a controller unit 30 having an interface screen 32 and a printer 40. The image source 20 receives or creates an image which is then sent in digital form to the controller unit 30. The controller unit 30, in the preferred embodiment, is a computer processor unit which controls the operation of the input devices to select an image or an image input device, receive the digital version of such an image, manipulate the image if necessary and then send printer control signals to the printer based on the final image. The printer 40 then prints the image using edible inks onto an edible food item.

The preferred embodiment is illustrated as an integrated system. It is to be clearly understood that each of the components of the present invention can be detached from this system and at a separate physical location. Each of these components need only be accessible to the other components by some method of digital transmission, such as cables, telecommunication lines, wireless or any other data transmission system. Also, the data could be output from any of the components onto external storage media, such as floppy disks, zip drives, cd-rom or any other storage media and then retrieved into the other components.

Image Source

The image source 20 can be one or more of various devices. In the preferred embodiment, the image source 20 includes a scanner 22, a library of digital art 24 stored on either a storage drive in the controller unit 30 or on an external storage device, and other image sources indicated at 26 which include without limitation film/slide scanners, digital cameras, networked image libraries, and any other digital image source. The scanner 22 can be a flatbed scanner or other types of scanner such as a drum scanner or a through feed scanner. The scanner allows an image to be rendered from personal photographs, such as of a person or event which is to be honored. Also, a computer processing unit may be connected to the controller unit 30 to create, edit and/or manipulate images with commercially available or proprietary software packages. The library of images are designated by a name, or in the preferred embodiment, by an Item Number. A catalog of thumbnail images with the designated Item Number, an example of which is shown in FIG. 2, is used to select the desired image from the library.

Controller Unit

The controller unit 30 includes, in the preferred embodiment, includes a computer processing unit, preferably a Raster Image Processor (RIP). However, a conventional computer processor can be used as well. Also, any other processing units which can digitally process the signals from the image sources can be used. The processor is operated via a touch screen user interface 32. It is to be expressly understood that other embodiments utilizing other types of input devices, such as a detached touch screen, keypads, joy sticks, voice commands, and the like are within the scope of the present invention. The touch screen user interface 32 allows the user to select from a variety of commands to customize an image or else simply use the default commands to process a standard size and type of image.

Figure 3:
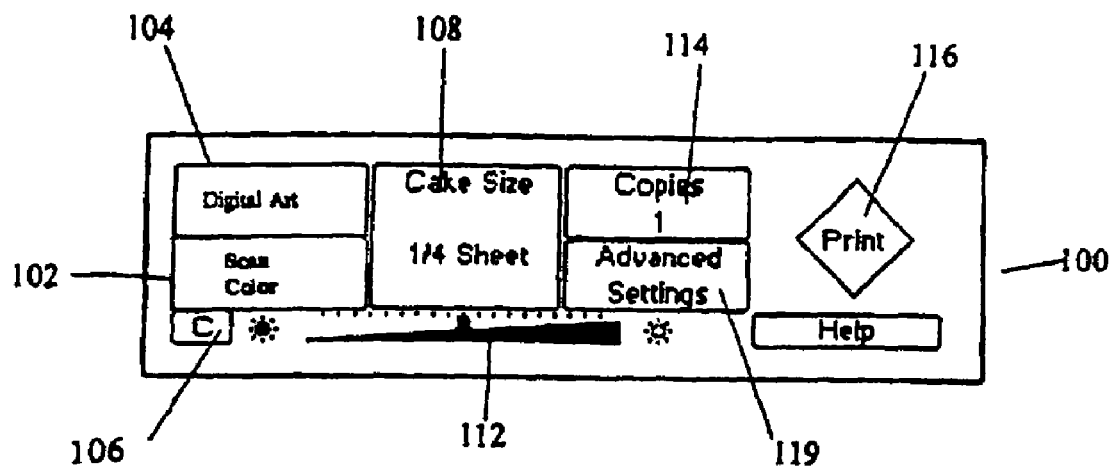
FIG. 3 is a view of the first-level display menu of the controller unit of the embodiment of FIG. 1.
Figure 4:
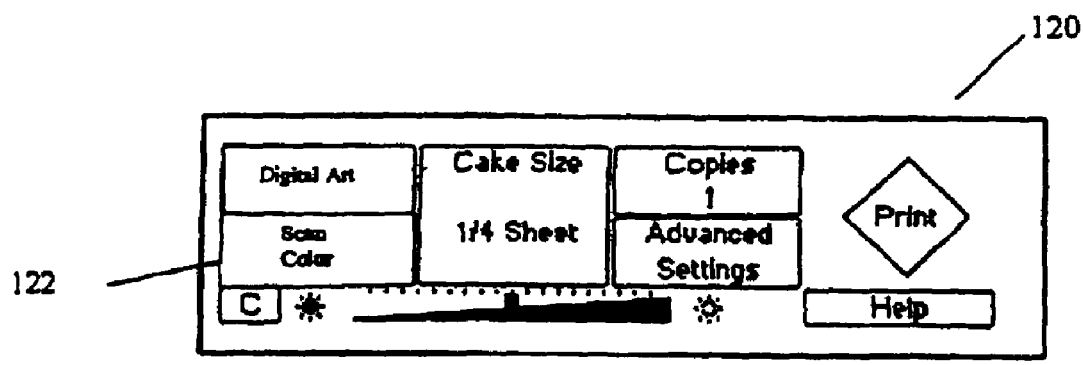
FIG. 4 is a view of display menu of FIG. 3 on the Scan Black & White mode.
Figure 5:
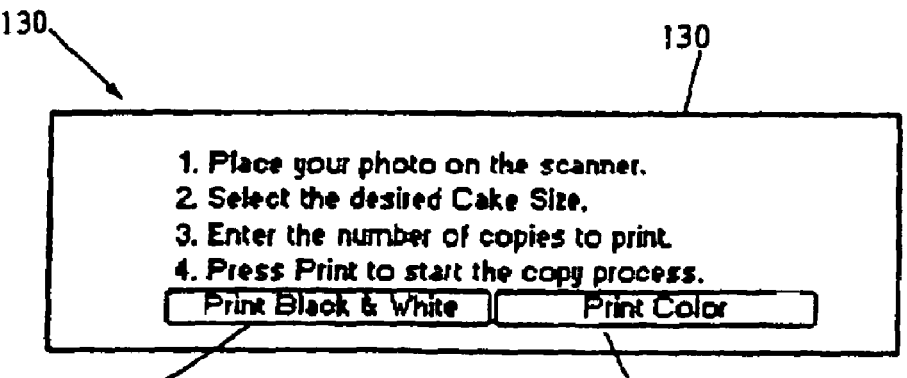
FIG. 5 is the display menu of FIG. 3 on the instructions for scanning mode.

The first-level display screen 100, as shown in FIG. 3, provides a relatively self-explanatory operation menu on touch screen user interface 32. The user simply selects the image input source, which in this embodiment includes Scan button 102 indicating the scanner 22 and Digital Art button 104 indicating the Digital Art source 24 stored on the storage drive in the controller unit 30. The default value for the Scan button 102 is for the scanned image to be in color. However, if the image is to be scanned as a black and white image, then Scan button 122 is touched by the user. The display screen 32 displays the directions on menu 130, as shown in FIG. 5 to operate the system. The user is directed to place the photograph from which the image is to be created on the scanner 22, select the appropriate cake size, touch the number of copies that are to be created and then select the print to start the process. If the image is to be printed in color, the Print Color button 134 is touched and display screen 32 reverts back to the display shown in FIG. 3. If the image is to be printed in black & white, then Print Black & White button 132 is touched and the display screen 32 then reverts back to the display shown in FIG. 4.

Figure 6:
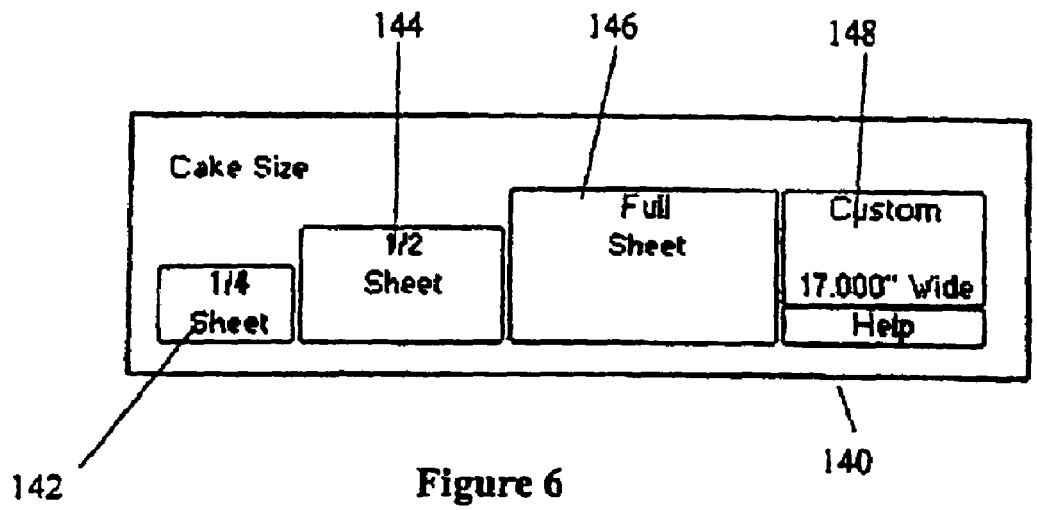
FIG. 6 illustrates the Cake Size menu display.

The user then selects the desired cake size by touching the Cake Size button 108. Menu 140, as shown in FIG. 6, is then displayed. The values for the different cake sizes include standard sizes of cakes, as is known in the baking industry. For instance, ¼ Sheet button 142 indicates a quarter sheet size, Sheet button 144 indicates a one-half sheet size and Full Sheet button 146 indicates a full-sheet size. Custom button 148 allows a custom size to be created up to a width of seventeen inches. The length will be automatically calculated from the original image's aspect ratio or length to width ratio.

The brightness/darkness of the original image can be adjusted by the brightness/darkness balance slider 112, as shown in FIG. 3. This allows the user to compensate for images that are overly light or overly dark. Copies button 114 allows the user to select the number of copies which are to be printed. For instance, if a number of identical images are to be created for multiple food products, then that number can be selected. Also, selections can be made as to printing of multiple identical images onto a single media, the printing of distinct multiple images printed onto a single image, multiple images overlayed onto the media, a single image printed in separate tiles onto multiple media or other image effects. Also, in one embodiment of the invention, a multiple feed system for feeding blanks into the printer can be used to automate the process.

Once the image source, the cake size and the number of copies has been selected, then the user touches the Print button 116. The scanner, if selected as the image source, is activated and scans an image based on the photograph which had been placed on the scanner. This image is sent by digital signals to the controller unit 30 which then converts those digital signals to printer control signals to the printer. The image is printed, as discussed in greater detail below, on an edible food item with edible inks in the size selected. This printed edible food item can then be placed on the cake or other food product.

Figure 7:
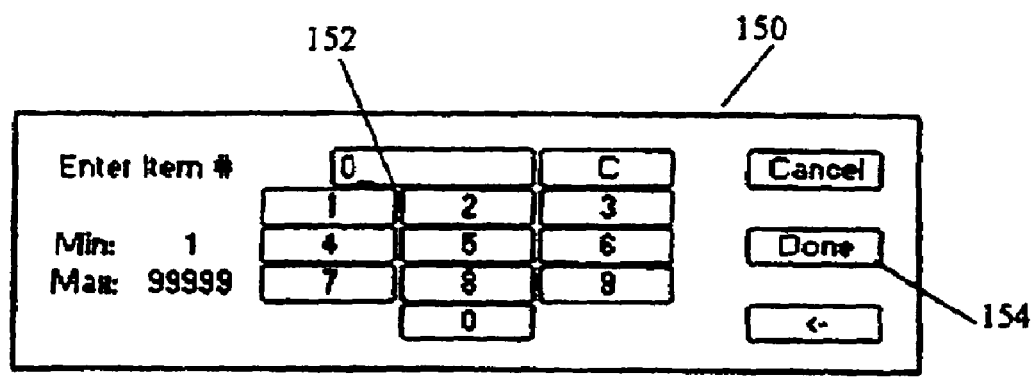
FIG. 7 illustrates the Digital Art selection menu display.

The controller unit also provides other options for the user. For instance, the source of the image to be created can be selected via Digital Art button 104 to be from the library of Digital Art images. These Digital Art images can be licensed clip art images, such as shown in FIG. 2, or other images such as a personal data base of images. If the user decides to use an image from the library instead of scanning an image, then Digital Art button 104 is selected. A key pad menu 150, as shown in FIG. 7, is then displayed on the touch screen 32. The user selects the Item Number for the desired image from the catalog, an example of which is shown in FIG. 2, touches the appropriate numeric buttons 152 on the key pad menu 150 and selects the Done button 154. The touch screen 32 will then display menu 160, shown in FIG. 8, confirming the selection and availability of that image.

Figure 9:
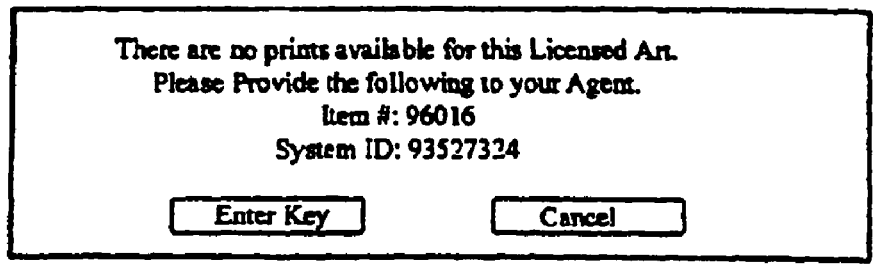
FIG. 9 illustrates the non-verification of the selection of the Digital Art Item display.

If the library does not have that image or the image is a limited use image and the licensed number of uses has been previously selected, then the touch screen 32 displays a message to that effect, shown in FIG. 9. The user can then contact the appropriate source and obtain a "key" number which will activate the licensed image for additional uses or else select another image. Once an image has been selected, the user can then select the size and number of copies and print the image.

Figure 8:
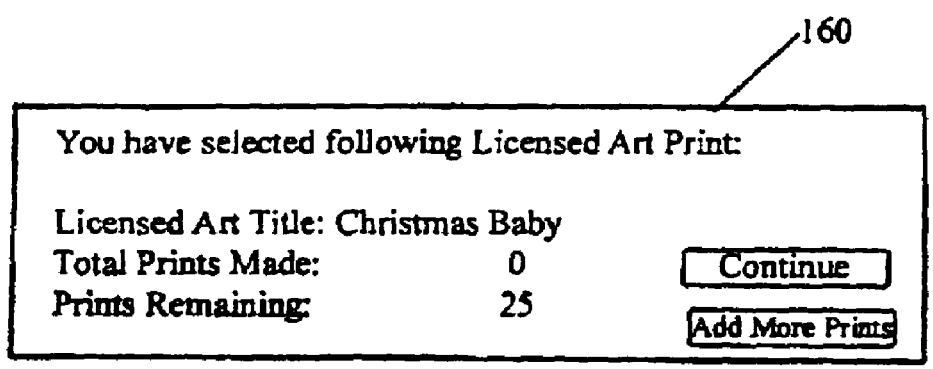
FIG. 8 illustrates the verification of the selection of the Digital Art Item display.
Figure 12:
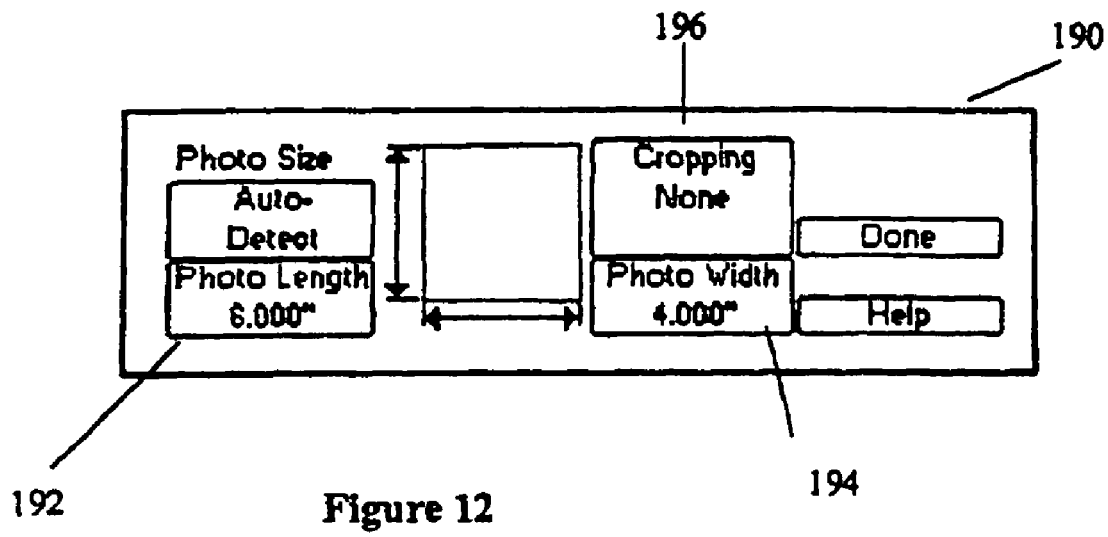
FIG. 12 illustrates the Photo Size Manual menu display.
Figure 13:
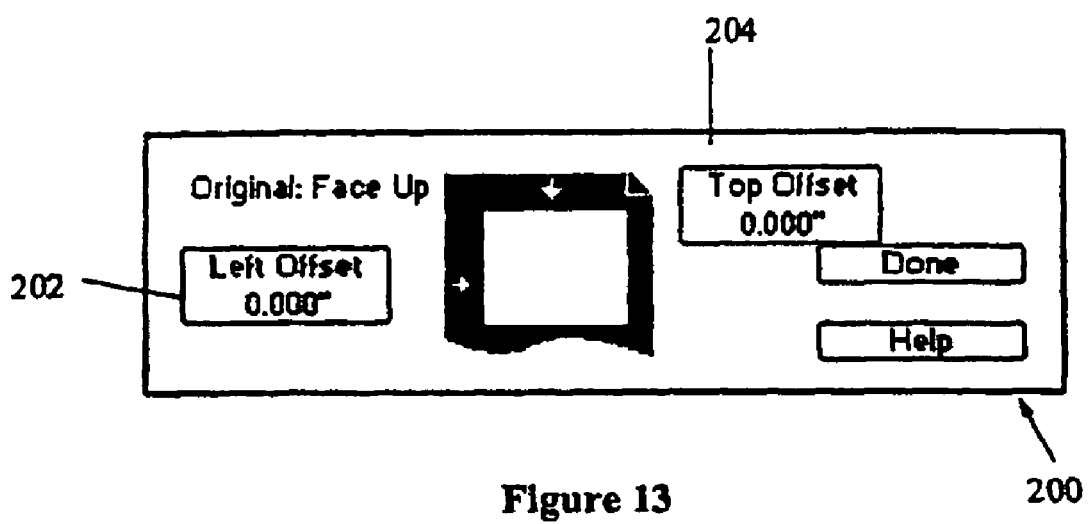
FIG. 13 illustrates the Cropping menu display.
Figure 14:
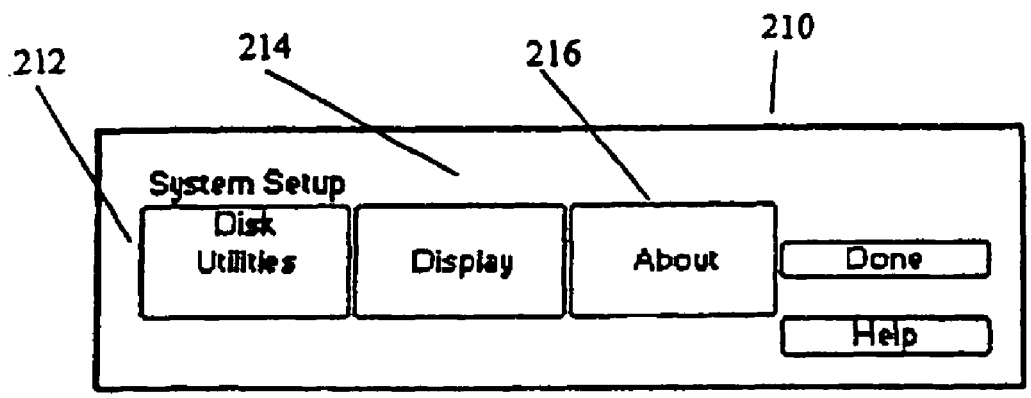
FIG. 14 illustrates the System Setup menu display.

The controller unit 30 also includes other custom features. The user can select the Advanced Settings button 119 on the display screen illustrated in FIG. 3. The touch screen 32 then displays menu 170, shown in FIG. 10. Several custom features are selectable from menu 170. One custom feature is to either have the scanner automatically detect the size of the image to be scanned or manually set the size. For instance, if the scanner is having difficulties automatically detecting an entire photo due to a light background color, the user can provide the measurements. The user selects the Photo Size Auto-Detect button 172. The controller unit 30 then displays menu 180, shown in FIG. 11. If the Manual button 182 is selected, then menu 190, shown in FIG. 12 is displayed. The size of the image to be scanned is set by selecting appropriate values from the Photo Length button 192 and the Photo Width button 194. Key pad menus, similar to the key pad menu 150 shown in FIG. 8, are displayed once the Photo Length button 192 and the Photo Width button 194 are selected to set the appropriate size values.

The user can also crop an image by selecting the Cropping button 196 following the selection of Manual button 182. The Manual button 182 is first selected and then the Photo Length button 192 is selected to enter the crop box desired length and the Photo Width button 194 is selected to enter the crop box desired width. The Cropping button 196 is then selected displaying screen menu 200, shown in FIG. 13. The Left Offset button 202 and the Top Offset button 204 are selected and the desired values are entered in a key pad similar to display 150 of FIG. 7. These desired values allow the user to move the set crop box to the desired position in respect to the original image. With the crop box size and positioning, the scanner can now scan a specific portion of the original image and perform the cropping operation.

Figure 10:
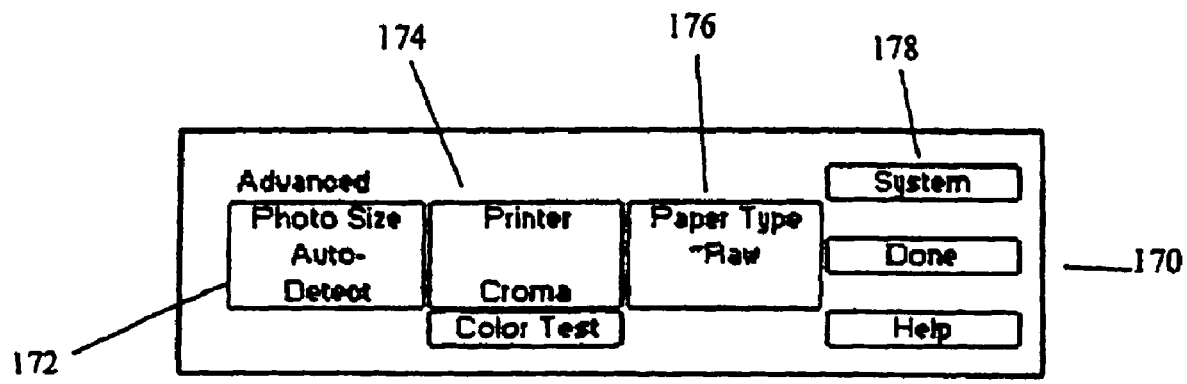
FIG. 10 illustrates the Advanced Settings menu display.
Figure 11:
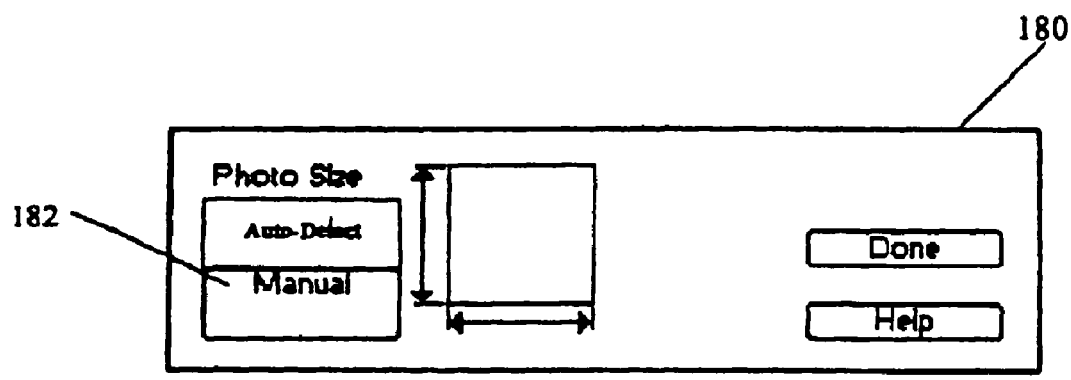
FIG. 11 illustrates the Photo Size Auto-Detect menu display.

The user can select from a menu of available printers by touching the Printer button 174, shown in FIG. 10. The screen will display the available printers from which the user can select. Once the desired printer is selected, the screen will automatically return to the Advanced Settings menu, shown in FIG. 10.

The user can also select the media on which the image is to be printed. These different types of media will be discussed in detail below. The user touches the "Paper Type" button 176 and selects from a displayed menu of available media. The screen will then automatically return to the Advanced Settings menu.

Figure 15:
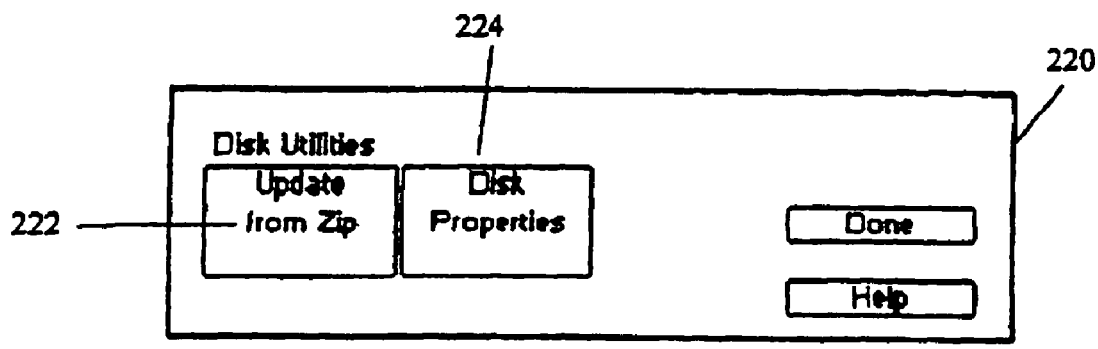
FIG. 15 illustrates the Disk Utilities menu display.
Figure 16:
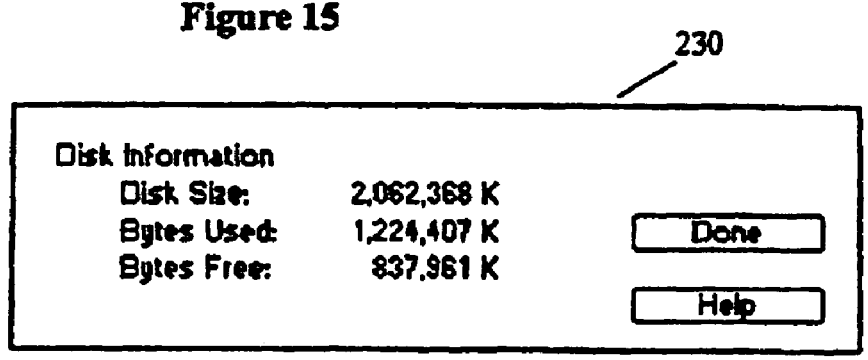
FIG. 16 illustrates the Disk Information menu display.
Figure 17:
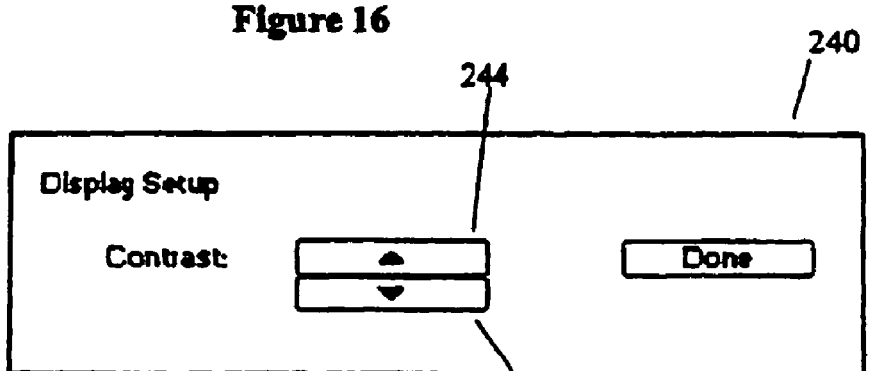
FIG. 17 illustrates the Display Setup menu display.

The user may also make changes to the system itself. The System button 178 is touched which causes menu 210, shown in FIG. 14, to be displayed. The user can update the controller unit 30 by touching the Disk Utilities button 212. Menu 220, shown in FIG. 15, is displayed. The user can then update the system (with newly released versions, library images or other updates) by touching the Update button 222 and selecting the source of the update. The user can also obtain information about the system by touching the Disk Properties button 224. This displays menu 230, shown in FIG. 16, which gives the current status of the system properties.

The user may also make changes to the display screen 32 itself. Touching the Display button 214, shown in FIG. 14, causes the menu 240, shown in FIG. 17 to be displayed. The contrast of the display screen 40 can then be adjusted by toggling the Arrow buttons 242, 244.

Figure 18:
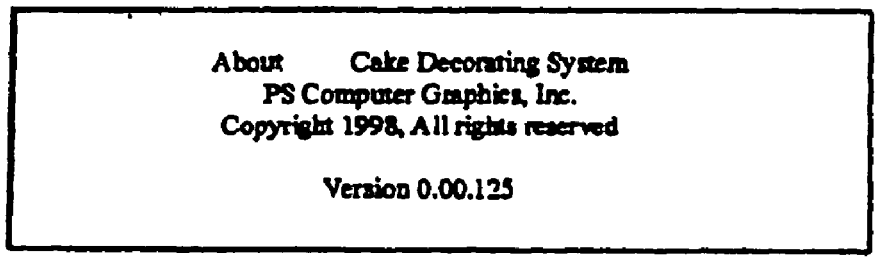
FIG. 18 illustrates the About menu display.

The user may also obtain information about the system by touching the About button 216. This displays information relating to the owner of the intellectual property rights of the system as well as the version number of the system, as shown in FIG. 18.

Each of the displayed menus also include a Help button, to assist the user with information regarding that particular menu, and a Done button, to return the user to the appropriate menu once the particular selection has been made.

Media

A critical feature of the system 10 of the present invention is the edible media on which the image is printed. This edible media, in the preferred embodiment, includes at least one edible layer and an edible coating. One embodiment of the edible layer of the media is a mixture of a sugar paste of varying thickness, referred to in a generic sense as fondant in the baking industry. In the preferred embodiment of the invention, the fondant has been specially formulated for several key features. First, the fondant must be able to depict high-quality pictorial images from the edible inks, described below. Second, the fondant must be able to travel through a printer without damage. Thus, the fondant must be of sufficient strength to be bent and manipulated through the conveying path of the printer, withstand the heat of the printing process and still being not overly thick to jam in the printer mechanism. Third, the fondant must be able to not detract from the taste of the food product on which it is to be applied.

The above preferred embodiment of the fondant of the present invention is described herein for explanatory purposes and is not meant to limit the scope of the present invention. This embodiment of the edible layer is formed from sugar, sorbitol, hydrogenated palm kernel oil, xanthan gum, locust bean gum, gum tragacanth, dried glucose syrup, glaze and water. Other variations of fondants may be used as well.

Other examples of edible layers are described in U.S. Pat. No. 5,017,394, assigned to the Lucks Company, and incorporated herein by reference. This type of edible layer is formed from a flour and/or starch base as opposed to the sugar base of the fondants. Another example of an edible layer is disclosed in U.S. Pat. No. 5,334,404, issued to Garcia et al. and incorporated herein by reference.

Other types of edible layers used in the present invention include rice paper, wafer paper, and other edible substrates on which an image may be printed.

The edible media, of the preferred embodiment, also includes a coating on at least a portion of the edible layer. This coating enables the edible media to render a high quality pictorial image on the surface of the edible layer. Without this coating, the inks tend to run or bead or form an imperfect image. In one preferred embodiment, the coating is a very thin layer of calcium carbonate. This thin layer allows the inks to properly perform to render a high-quality pictorial image. Other coatings may be used as well.

Figure 19:
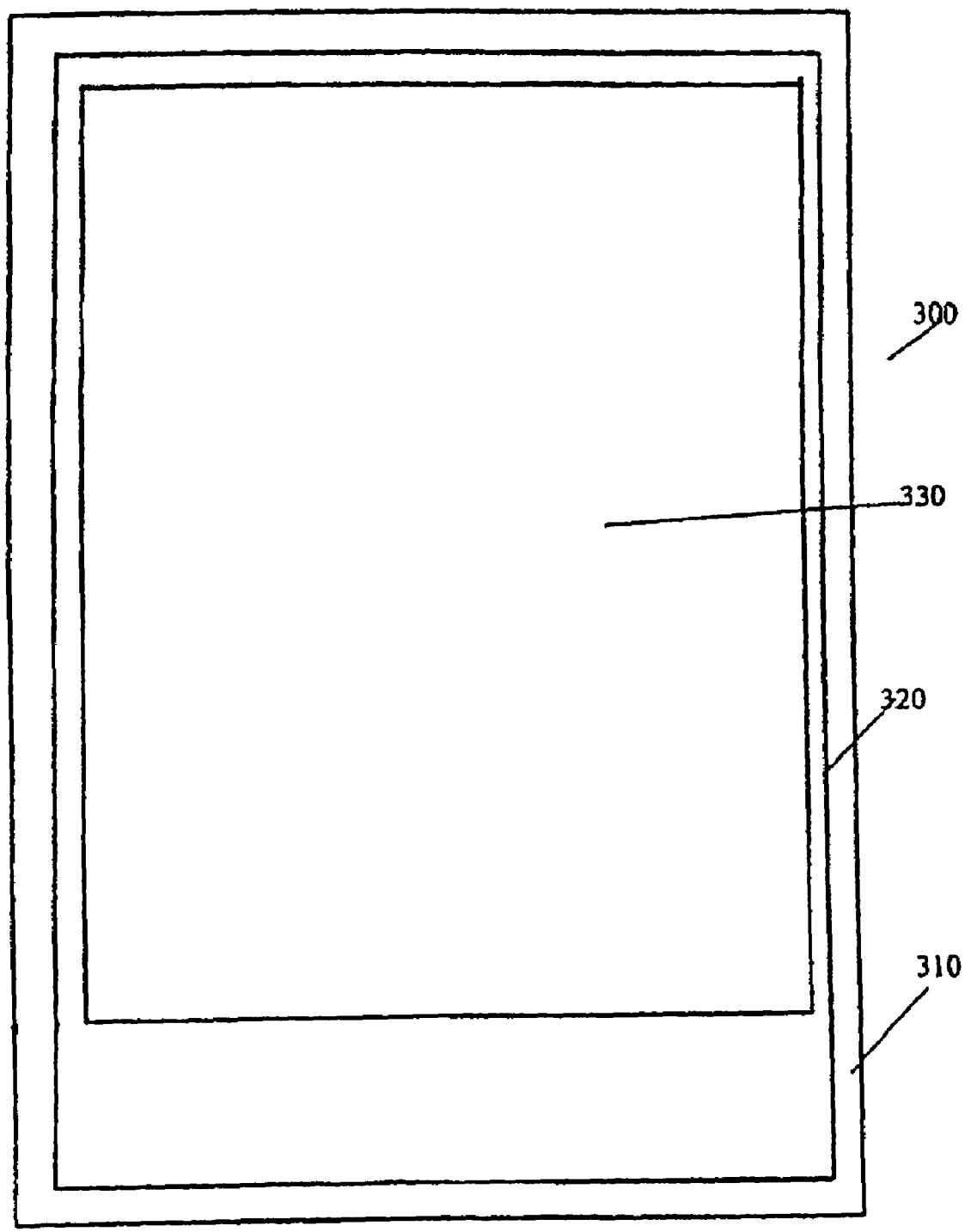
FIG. 19 is a top view of the edible media of the preferred embodiment of the present invention.
Figure 20:
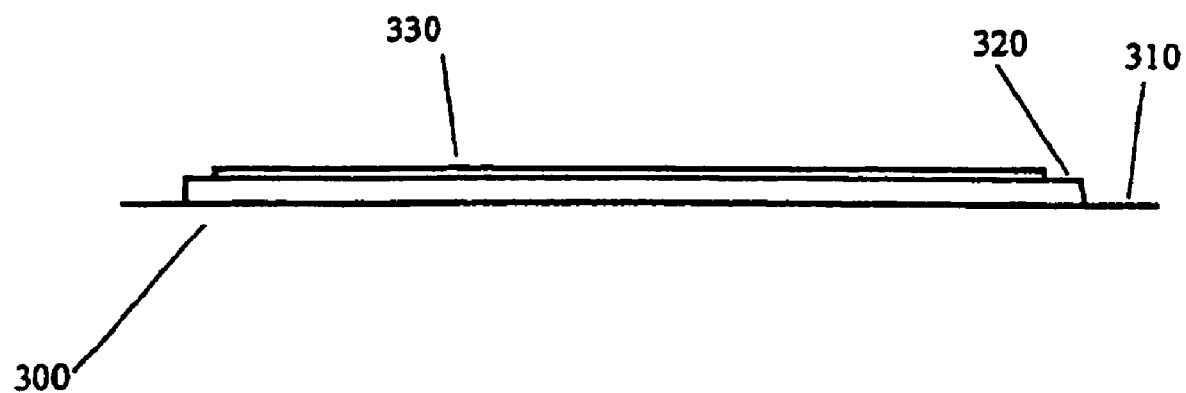
FIG. 20 is a cut-away view of FIG. 19 along lines 20-20.

A preferred embodiment of the media of the present invention is illustrated in FIGS. 19 and 20. The media 300 includes a release sheet 310 having a silicon coating, the edible layer 320 and a coating 330. The coating 330 is an edible film, as discussed above, upon which the edible inks may be printed to create a high quality pictorial image.

Edible Inks

Another key component of the present invention are the inks used in the printing process. These inks have been specially formulated from food grade colors to enable high quality, near-photographic images to be printed onto the edible media described above. These inks not only must be edible and have precise color-matching properties, they must also function in a manner similar to other commercially available inks in the printers. That is, unlike the prior art food decorating systems which have been specially designed to use existing food colors, the present inks have been designed be usable in commercial print systems and printing technologies, as described in detail below.

The edible inks of the preferred embodiment of the present invention are formulated to faithfully render images in accordance with the Cyan, Magenta, Yellow and Black (CMYK) color model. This provides adherence to most commercially available color matching systems, thus ensuring that the image obtained from the image source (scanner, library or other image input device) to be precisely printed onto the edible media. It is to be expressly understood that inks which are formulated to render high quality images in accordance with other color models are also within the scope of the present invention. For instance edible inks which are formulated in accordance with color models including without limitation RGB, LAB, HSB, Panatone, Hexachrome and others are also within the present inventive scope.

One embodiment, provided for explanatory purposes only and not to limit the scope of the present invention is provided below:

Cyan: water, isopropyl alcohol, sodium lauryl sulphate, FD&C Blue #1
Magenta: water, isopropyl alcohol, sodium lauryl Sulphate, FD&C Red #3 & FD&C Blue #1
Yellow: water, isopropyl alcohol, sodium lauryl sulphate, FD&C Yellow #5
Black: water, isopropyl alcohol, sodium lauryl sulphate, FD&C Blue #1.

Other embodiments of the edible inks of the present invention that provide faithful matching to the CMYK color model, as well as other color models, and that function within the constraints of commercially available printing technologies are considered to be within the scope of the claimed invention.

Printer

The printing device 30, in the preferred embodiment, includes a feed path through which the item to be printed is inserted and conveyed past one or more printheads. In the preferred embodiment, the printhead technology can be any type of printhead which can be controlled by digital signals. In the preferred embodiment, print technology encompasses all types of inkjet print technology. In these systems, the edible inks described above are fed from a cartridge reservoir. These cartridge reservoirs may be refilled as need.

In one preferred embodiment, the printhead is a thermal inkjet printhead. Thermal inkjet printheads use a resistor which rapidly heats up a thin layer of the ink. This rapid heating causes the ink to form a bubble which ejects the ink through the nozzle. Since there are no mechanically moving parts, very high operating frequencies are possible.

In an alternative embodiment, the printheads use piezo inkjet technology. This technology uses a piezoelectric crystal to push and pull a diaphragm which lies beneath the firing chamber. The displacement caused by the movement of the diaphragm ejects the ink through the nozzle. The piezo inkjet can be either solid piezo inkjet technology or liquid piezo inkjet technology.

Other types of inkjet technology for use in the systems of the present invention include continuous inkjets, valve jets, electrostatic inkjets and airbrush technology. Also, as inkjet technology evolves, other inkjet technology may be incorporated into the systems of the present invention.

Other embodiments encompassing other digital printhead technology other than inkjet technology are considered within the scope of the invention as claimed as long as edible inks capable of precise color matching are usable. The descriptive embodiments of printhead technology are provided for explanatory purposes only and are not meant to unduly limit the scope of the claims of the invention.

In another alternative embodiment of the present invention, the image is printed onto a transfer layer, which in turn is applied onto the edible media.

Use

The use of the system of the preferred embodiment has been deliberately designed to be simple, with no computer skill necessary to operate. The system is able to be flexible in the capability of decorating a wide range of food products.

The user first inserts the edible media into the feed path of the printer. Then, the user selects from the menu of image sources. The cake size is then selected and the number of copies chosen. Then the print process is activated. The image is then printed with the edible inks onto the media. The media is placed onto the food product, either on the site, or since it is compact and easily transportable, at the site of the event.

The user can select from several image sources, such as a scanner or image library. A personal photograph can be used to create the printed image by use of the scanner option. The scanner can be set to automatically detect the size of the image, or the user can manually select the size of the image if desired. The image library can be easily updated as desired.

The system is designed so that the user can easily adjust or update the system to incorporate future enhancements.

The system uses a series of touch screen menus to enable the system use without the need of a computer keyboard.

Another feature of the present invention is the capability of the system to be operated through telecommunications or via an Internet site. A user could order the select or transmit an image to a remote site which could then print and ship the printed media via express delivery. The user could either order a cake, acquire one locally, or bake their own cake upon which the printed media could be placed. Also, the user may simply be able to go to a kiosk, input or select their image, and transmit this information then to a remote site. The remote site will then print the image on the media and ship it to the user, either on a food product or as is.

This descriptive embodiment is intended for explanatory purposes only. The present invention, as claimed, includes other implementations and embodiments as well.

In some embodiments, a decorating system for edible products may include a graphical user interface and process that can be readily learned and implemented by inexperienced users. Such a system may also provide simplified installation, operation, and maintenance along with the space-saving benefits of having a relatively compact size.

Figure 21:
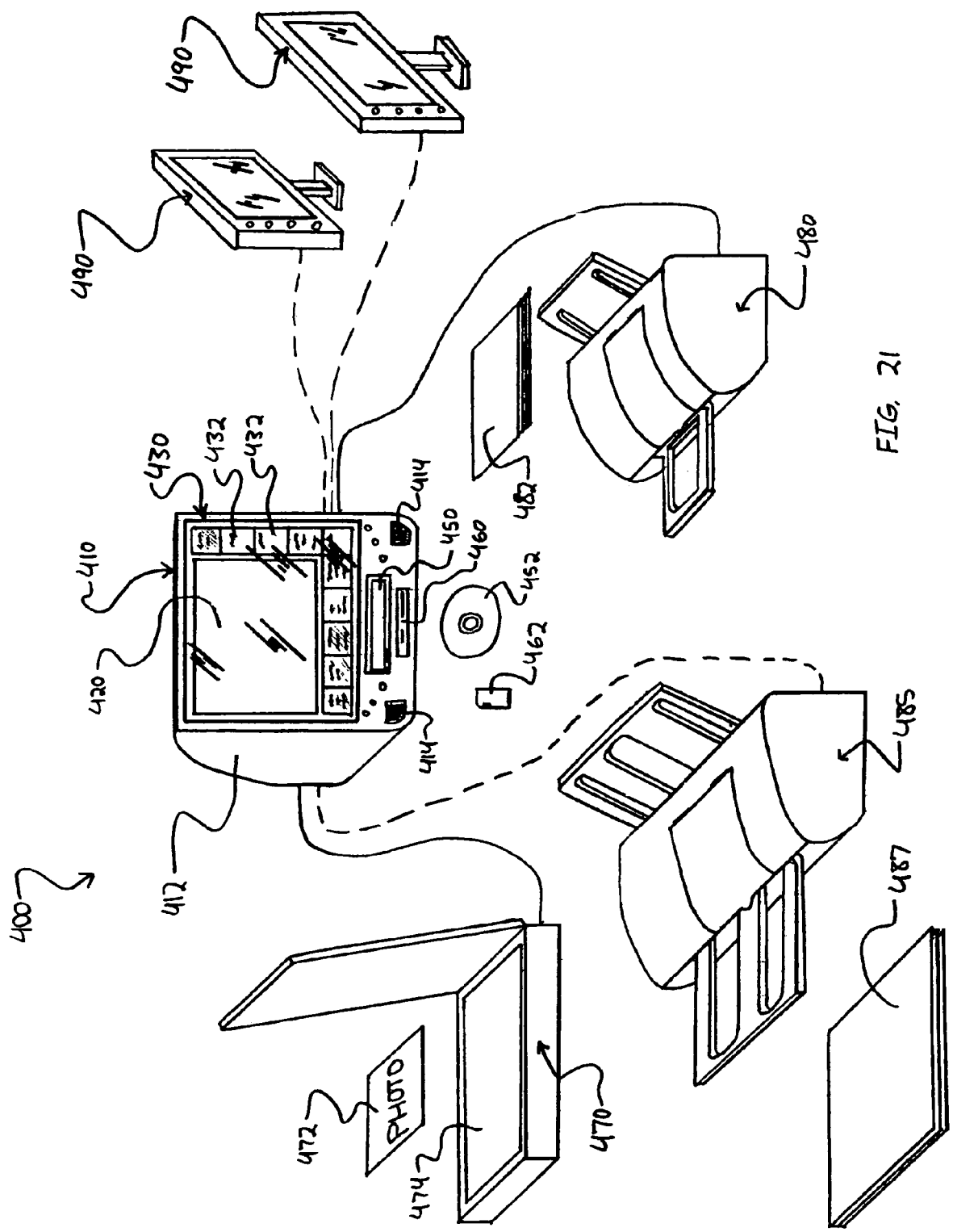
FIG. 21 is a perspective view of yet another embodiment of a decorating system.

Referring to FIG. 21, a decorating system 400 includes a primary unit 410 that is capable of receiving electronically recorded images from various image sources and transmitting signals to a printer device for printing at least a portion of the electronic image. The primary unit 410 includes a touchscreen 420 positioned over a display device 430. The touchscreen 420 is configured to receive input commands from a user, for example, when the user's fingertip or a stylus contacts the touchscreen 420. Somewhat similar to the previously described embodiment shown in FIG. 1, the display device 430 is capable of displaying "buttons" 432 that may be pressed by the user when the area of the touchscreen 420 overlaying the button 432 is contacted. Thus, the user is able to operate the decorating system 400 by interacting with the touchscreen 420 and the graphic user interface on the display device 430. In one embodiment, the display device 430 includes a 14.1" color flat panel display. Such a full-sized color display and touchscreen combination may simplify the user's interaction with the decorating system 400.

The primary unit 410 also includes one or more data readers that are capable of receiving removable discs or other such removable media. In the embodiment shown in FIG. 21, the primary unit 410 includes disc reader 450, such as a DVD device or a CD-ROM device. The disc reader 450 is capable of receiving and ejecting a removable disc 452 that contains information such as digital image files or system software updates. Preferably, the disc reader 450 is a DVD reader that is capable of processing information encoded onto DVD-formatted discs. Because these DVD-formatted discs are capable of storing large amounts of data, system software updates and other large files may be input to the primary unit 410 on a single disc. The primary unit 410 may also includes a memory card reader 460 that is capable of receiving a removable memory card 462, such as compact flash EEPROM cards. As such, a person may record an image on the memory card using a digital camera, remove from the digital camera the memory card containing the digital image file, insert the memory card into the memory card reader 460, and use the primary unit 410 to view, edit, and print the image. Thus, the disc reader 450 and the memory card reader 460 are each capable of being one of the image sources for the decorating system 400.

In some embodiments, the primary unit 410 also includes one or more audio speakers 414 that output voice, music or the like to the user positioned in front of the display 430. The speakers 414 may output verbal instructions that supplement that onscreen instructions and describe proper operation of the decorating system 400. For example, the speakers 414 may output a human voice that states, "Welcome! Please press the touchscreen to begin your decorating experience." When the user progresses through the various stages of the process flow, the speakers may voice other instructions or verifications to the user. The speakers 414 may also output audible alerts to provide the user with information, such as notifications of printer malfunction or other device errors.

Figure 22:
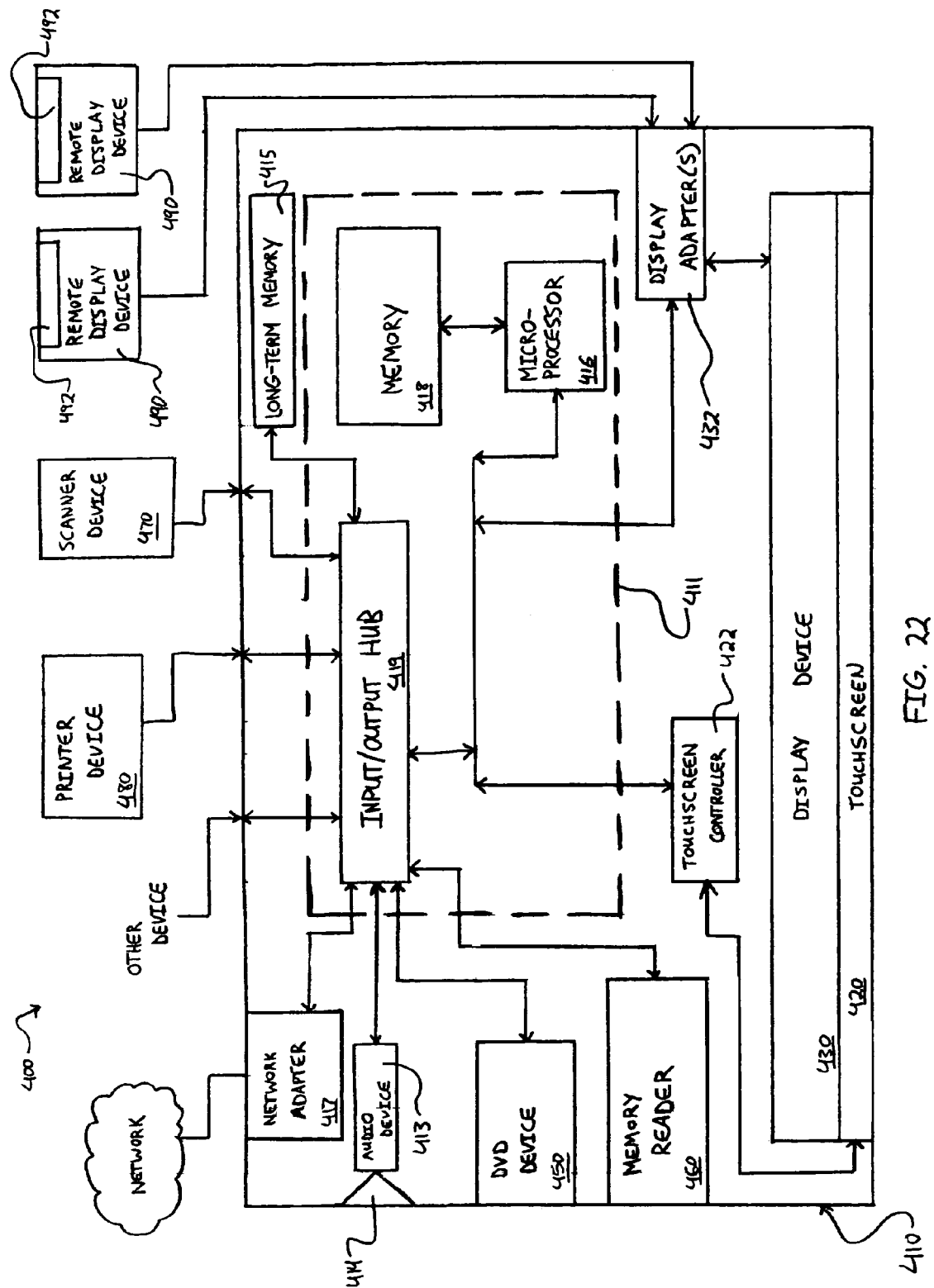
FIG. 22 is a block diagram of the decorating system of FIG. 21.

Referring to FIGS. 21 and 22, the speakers 414, touchscreen 420, display 430, disc reader 450, memory card reader 460, and a processing unit 411 including microprocessor 416 (FIG. 22), computer memory 418 (FIG. 22), and I/O hub 419 are disposed in a housing 412. The primary housing 412 includes several openings or slots that provide user access to some components, such as the touchscreen 420, the disc reader 450 and the memory card reader 460. Such an all-in-one construction simplifies the installation and set-up of the decorating system 400. Moreover, the relatively compact assembly of the primary unit 410 provides the user with a space-saving workstation that requires only a limited amount of equipment to scan, view, edit, and print the desired images. In some embodiments, the disc reader 450, the memory card reader 460, or both may be removably installed into the housing 412 so that a reader may be removed and separately serviced or repaired while the primary unit 410 remains operational to receive images from the memory 418, the disc reader 450, or the scanner device 470. Such a construction minimizes the downtime of the decorating system 400 when a single component requires repair or replacement.

In addition, the primary housing includes one or more port openings (not shown in FIG. 21) that permit wired connections between components of the primary unit 410 and various external devices (e.g., a scanner device 470 and a printer device 480). The scanner device 470 transmits graphics data to the primary unit 410. In FIG. 21, the scanner device 470 is depicted as having a wire connection with the primary unit 410, but as previously described, other forms of data transmission are contemplated. One suitable scanner device 470 is an EPSON PERFECTION 2400 scanner supplied by EPSON AMERICA, INC. of Long Beach, Calif. The scanning device 470 is operable to record an image from a tangible object and to transmit electronic information about the recorded image to the memory 418 of the primary unit 410. For example, a photograph 472 or other tangible object can be placed on the glass sheet 474 of the scanner device 470, and the image on the photograph 472 may be transmitted and recorded to the memory 418 as digital data. Accordingly, the scanner device 470 serves as one of the image sources for the decorating system 400.

Still referring to FIG. 21, the decorating system 400 also includes at least one printer device that is capable of dispensing edible ink onto edible media. The printer device 480 is connected to the primary unit 410 such that the printer device 480 is able to receive signals transmitted from the primary unit 410. For example, when the user prompts the primary unit 410 to print the desired image, the processing unit 411 transmits printer control signals to the printer device 480, which causes the desired image to be printed on the properly inserted edible media 482. The printer device 480 may have a relatively compact size while being capable of printing high quality color images to the edible media 482. For example, the CANON i560 printer supplied by CANON U.S.A., INC. of Lake Success, N.Y. is capable of printing high quality images onto edible media 82 (sized for cakes up to ¼-sheet or round cakes) without damaging the edible media 82 during the printing process. Alternatively, the decorating system may include a printer device 485 that is configured to print images onto large-format edible media 487 sized for cakes up to ½-sheet. One such printer device 485 that has a relatively compact size is the CANON i9100 printer, which a capable of printing high quality images on larger-format media 487 without damaging the edible media 87. Moreover, both printer devices 480 and 485 may be simultaneously connected to the primary unit 410 so that the user is able to select which printer device 480 or 485 performs the printing task. The edible media sheets 482 and 487 may include a release sheet (refer to FIGS. 19-20), but in some embodiments, the release sheet is removed before the edible media is loaded into the appropriate printing device.

Optionally, the decorating system includes one or more remote display devices 490 that are able to receive signals from the primary unit 410. In FIG. 21, the display devices 490 are depicted as having an optional wired connection to the primary unit 410, but other forms of signal transmission, such as wireless transceivers, may be used between the primary unit 410 and the display devices 490. Depending on the intended use of each display device 490, the display devices may be optionally equipped with a touchscreen. Instead, the display device 490 may be used to show at least a portion of the material displayed on the screen 430 of the primary unit 410 to a viewer located remotely from the primary unit 410 (described more in connection with FIG. 23). In addition, the display device 490 may be used to show advertisements of the decorating system 400 to a remotely located viewer. Alternatively, the remote display devices 490 may show an instructional video presentation, which is stored in the memory 418 or on a DVD disc in the disc reader 450. Such an instructional video presentation may educate the remotely located viewer about the features of the decorating system 400 or about any other relevant topic. The primary unit 410 may be programmed such that the remote display devices 490 do not necessarily display the same images. For example, one remote display device 490 may show an image that was recorded by the scanner device 470 (e.g., mirroring the material that is displayed on the primary display device 430), while another remote display device 490 shows a third party commercial or an infomercial that explains the benefits and possible uses of the decorating system 400.

Referring to FIG. 22, the display device 430, the touchscreen 420, and the processing unit 411 are housed in the primary housing 412. The microprocessor 416 and memory 418 are coupled such that the processor 416 may perform various operations on the data stored in the memory 418. A long-term memory unit 415, such as a magnetic hard disk, may be coupled to the processor unit 411 through I/O hub 419. Optionally, other system architectures may be used to transfer data and power between the various components of primary unit 410. The disc reader 450 and the memory card reader 460 are also coupled to the processor through an I/O hub 419 such that the processing unit 411 may direct the transfer of data from the readers 450 and 460.

In some embodiments, the printer device 480 may be equipped to transmit status signals to the processing unit 411 when certain maintenance or repairs must be performed, in response to which processing unit 411 may cause the display device 430 or speakers 414 to provide an audible and/or visual notification that such maintenance or repairs are necessary. For example, if the printer device 480 remains idle for a 14-day period, the printer device 480 may signal the primary unit 410 that the inkjet print heads must be cleaned using a printer maintenance function. After receiving such a notice from the printer device 480, the processing unit 411 may prompt the display device 430 to show the user an alert and to instruct the user on how to perform the maintenance. Such a self-driven maintenance feature may enhance the quality of the images printed by the decorating system 400.

One or more display adapters 432 are coupled to the processing unit 411. The display device 430 that is mounted in the primary housing 412 is connected with a display adapter 432 so that display signals are transmitted from the processor 416 or other devices to the display device 430. The primary unit 410 may communicate with the remote display devices 490 using display adapters 432 mounted in the primary housing 412. The display adapters 432 may connect with the remote display devices 490 using and interconnection device, such as a USB connector or a wireless transmitter/receiver device. Additionally, the touchscreen 420 may be connected to a touchscreen controller 422, which transmits user input signals to the processing unit 411. An audio controller is connected to on I/O hub 419 such that signals from the processor or other components may be converted into audible sounds output from the speakers 414.

Still referring to FIG. 22, a network device 417 is mounted in the primary housing 412 and connected to a system BUS. The network device is capable of transmitting and receiving data to and from a network (e.g., the internet, a local area network, or the like). When the network connection is properly established, the processing unit 411 may receive software updates or online technical support from a vendor's website or from a communication link between the primary unit 410 and a remote server. In addition, the network connection with the primary unit 410 may be used to order additional supplies (e.g., edible ink, edible media, or the like) or additional images from a remote image library.

Such an all-in-one system provides a relatively compact primary unit 410 and an efficient setup process. The external components, such as the printer device 480 and the scanner device 470, may be set up using relatively simple connections to the primary unit 410. Furthermore, the primary unit 410 houses a fill-size color display 430 and touchscreen 420, permitting novice users to intuitively input commands to the decorating system 400.

Referring to FIG. 23, the decorating system 400 is suitable for a commercial environment where a customer requests a decorating service. Examples of such a commercial environment may include a bakery, a candy or confectionary store, a grocery store, and other environments where food-decorating services are performed. In one embodiment, the decorating system 400 may be set up in a production area that is accessible to a worker in a bakery. Depending on the preferences of the bakery owner, the production area may be a relatively clean area that is separate from the service area where cakes and other foodstuffs are often handled and displayed to customers. As is frequently the case, the customers of the bakery do not necessarily have access to parts of the decorating system 400 because some customers are not well trained in the proper handling on the edible media 482 and the scanner device 470.

In this embodiment, a customer may enter the bakery in a customer waiting area and request that an image on the customer's photograph 472 be used to decorate a cake purchased by the customer, but the customer is not necessarily permitted to directly use the primary unit 410. Rather, the bakery worker accepts the photograph 472 from the customer and brings the photograph 472 to the primary unit 410 located in the production area. There, the photograph 472 is scanned using the scanner device 470 and electronic image data is recorded in the memory 418 of the primary unit 410. The image is shown to the worker on the display device 430, and the worker may use the touchscreen 420 to edit the image, add customized text, and add a frame to border the image (described in more detail below). The decorating system 400 includes a two remotely positioned display devices 490 having screens 492 that face toward the customer waiting area. Thus, one remote display device 490 may show a video advertisement of the decorating system 400, while another remote display device 490 shows the customer a step-by-step view of the image after each modification is performed by the worker using the primary unit 410. If the customer notices an unwanted modification (e.g., a misspelled name in the customized text) while the worker is preparing the image, the customer may easily inform the worker of the problem, in which case the worker could correct the mistake before printing to the edible media. When the desired modifications are complete, the customer may preview the final image one of the remote display devices 490 to give a final approval. Then the worker may print the final image to the edible media 482 using the printer device 480.

Unlike prior art systems where the customer was unable to view the editing and other modifications to the image (because the system display was located separately from the customer), the decorating system 400 provides the customer with an opportunity to preview the final image before printing. The remotely positioned display device 490 provides the worker an opportunity to correct any unwanted modifications to the image before printing the unwanted image to the edible media. Because the customer is permitted to preview the image on the remote display device 490 before the printing occurs, the decorating system 400 reduces waste of edible media and increases the customer's overall satisfaction.

Referring to FIGS. 24A-J, the decorating system 400 provides an easy-to-use onscreen process to create and print the desired image. The memory 418 of the primary unit 410 may have a software program recorded thereon that, when properly executed, causes a series screens to be displayed on the display device 430. In some embodiments, the software program is programmed in a LINUX operating system environment to reduce the processing overhead that is commonly associated with Windows™ operating systems. When LINUX software is used, customized device drivers are provided to enable communications between the processing unit 411 and the various peripheral devices, such as the printers, readers, and the like.

The display device 430 is capable of showing a sequence of screens depending upon the user's input. As previously described, the user may interact with the primary unit 410 by contacting the touchscreen 420 with the user's finger or stylus in proximity to a "button" shown on the display device 430. A plurality of buttons may be shown on the display device 430, with each button corresponding to a different command or option.

Figure 24A:
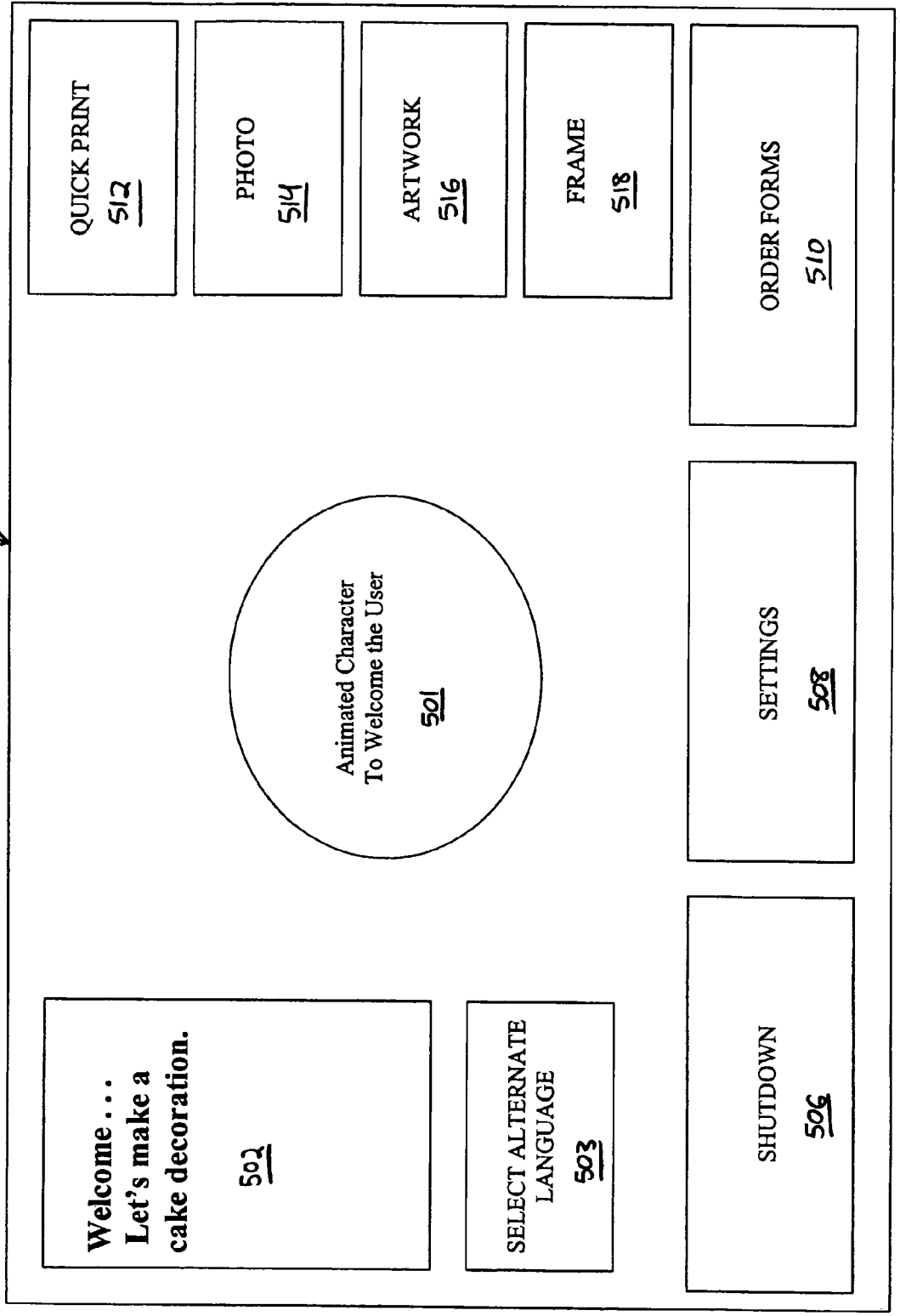

Referring to FIG. 24A, the initial screen 500 shown on the display device 430 provides various buttons that may be selected by the user to initiate certain sub-processes or to perform certain administrative tasks. The initial screen 500, along with other subsequent screens, may include an animated character 501, a dialogue box 502, or both so as to provide the user with helpful information or instructions. Optionally, one or more of the screens displayed to the user may provide a language-selection button 503 that causes the textual information to be displayed in one of a plurality of languages. For example, a Spanish-speaking user may prefer to operate the primary unit 410 using textual strings displayed in Spanish, so the user would contact the touchscreen 420 in proximity to the language-selection button 503, which would cause the screens to present textual information in Spanish.

The initial screen 500 may include one or more buttons that permit the user to perform certain administrative tasks. Shutdown button 506 may be selected by the user in order to shut down some or all of the components of the primary unit 410. The settings button 508 may be selected by the user to open a menu of system setting options, such as the disk utilities option, the display setup option, and default setting options that were thoroughly described in the previous embodiments. The order-forms button 510 may be selected by the user to open a menu of options related to the inventory and reorder of various decorating supplies. For example, after the order-forms button 510 is selected, another screen may present a set of buttons that permit the user to view an inventory of past edible ink usage, edible media usage, licensed image usage, or the like. Further, the order-forms button 510 may be selected to permit the user to print out blank forms for reordering new supplies, such as edible ink or edible media. Optionally, the primary unit 410 may include a network connection device such that the user may be presented with an option to order new supplies over the network (e.g., internet or direct connection to the supplier's computer system).

Still referring to FIG. 24A, the initial screen 500 includes one or more buttons that permit the user to perform certain decorating processes. When the quick-print button 512 is selected, the user is guided through a shortened process to quickly retrieve an electronic image from an image source, to view and optionally edit the image, and then to promptly print the image onto the edible media. Such a process is quite efficient if, for example, the user desires to print an image scanned from a photograph without adding customized features, such as an image frame or a textual message. The photo button 514 may be selected by the user to open a series of screens that permit the user to retrieve a photographic image from an image source (e.g., the scanner device 470 of the memory card reader 460), to edit the image, to add customized features to the image, to preview the final image, and to print the final image to the edible media. The artwork button 516 permits the user to perform many of the same functions as described in connection with the photo button 514, but the user is initially guided through the process of selecting electronic images from a digital library of previously stored images (rather than retrieving a photographic image from, for example, the memory card reader 460 or the scanner device 470). In one example, the desired image may include a child's favorite cartoon character, so the user may select the artwork button 516 to find the desired image in the digital library of cartoon character images. If the frame button 518 is selected, the user is guided through a more extensive process that includes many of the same functions described in connection with the photo button 514 and the artwork button 516. As described in more detail below, however, the user is guided through an additional process of selecting a frame into which the desired image (scanned or previously recorded) will be embedded before printing to the edible media.

Figure 24B:
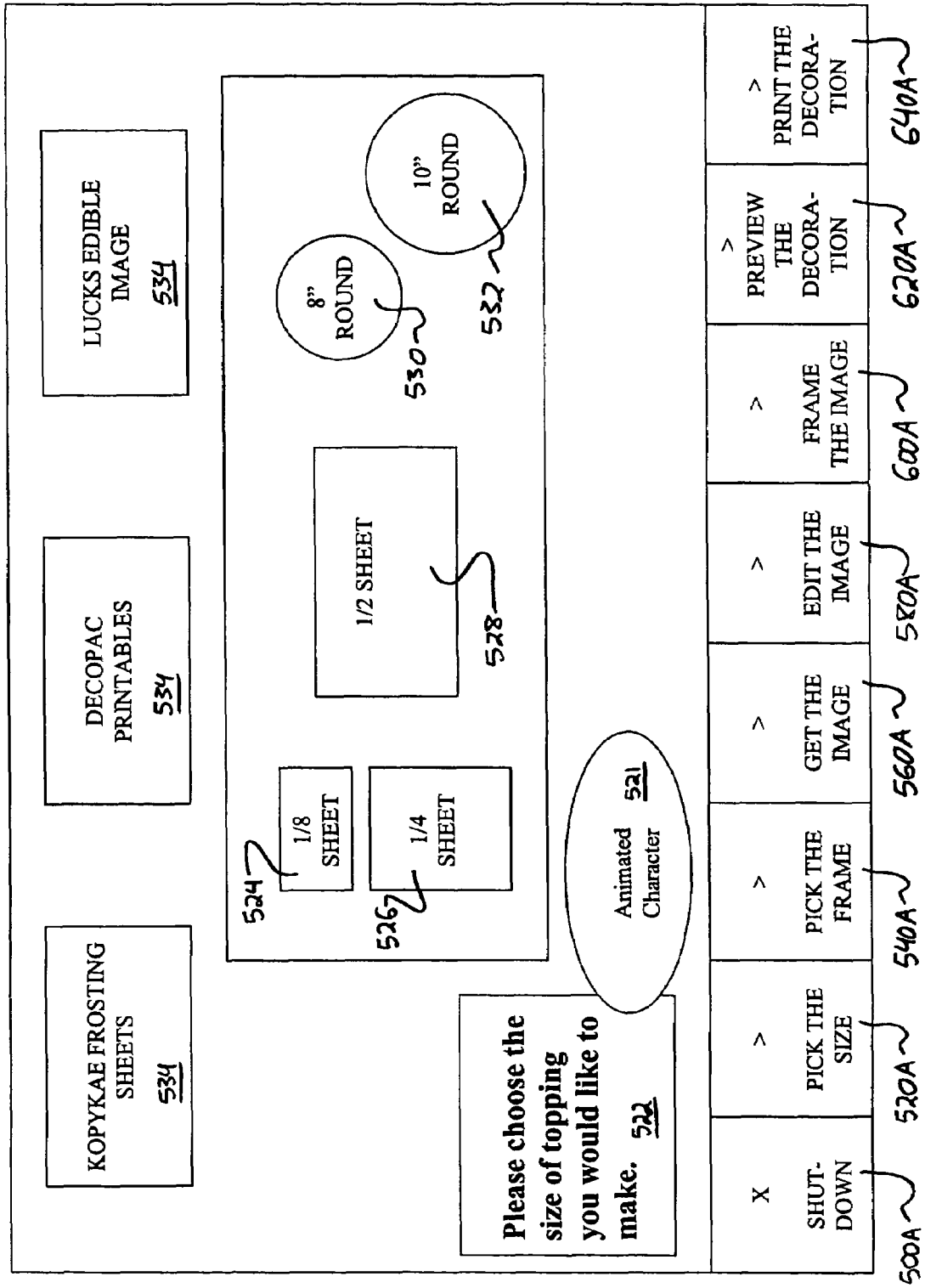

Referring to FIG. 24B, after the user selects the frame button 518 from the initial screen 500, a size-selection screen 520 is presented to the user on the display device 430.

Again, the size-selection screen 520 may include an animated character 521, a dialogue box 522, or both to provide the user with helpful information or instructions. The size-selection screen 520 guides the user through process of selecting the desired size of the foodstuff that will ultimately receive the printed edible media. In some embodiments where the edible media will be ultimately applied to the top of a frosted cake, the size-selection screen 520 may include visual representations of the various cake sizes. In FIG. 24B, for example, the size-selection screen 520 includes a ⅛-sheet button 524, a ¼-sheet button 526, a ½-sheet button 528, an 8-inch-round button 530, and a 10-inch-round button 532. Each of these buttons may have the visual appearance of a fronted cake in a typical bakery display shelf, thus making it easier for the user to identify which type of cake is desired. Furthermore, the size-selection screen includes buttons 534 that permit the user to select which type of edible media will be used in the printer device 480. If, for example, the user selects the ½-sheet button 528, the decorating system 400 may force the selection of a certain type of edible media that is properly sized for such a task.

Still referring to FIG. 24B, the sub-process screens, including the size-selection screen 520, include a set of process flow buttons 500A, 520A, 540A, 560A, 580A, 600A, 620A, and 640A. These buttons show the user the number of steps that have been completed in the overall process, and the number of steps that have yet to be completed. If the user selected a different sub-process from the initial screen 500, such as the photo button 514, the set of process flow buttons would be different (only including, for example, buttons 500A, 520A, 560A, 580A, 620A, and 640A). Button 500A is a cancel button that aborts the entire process and causes the display device 430 to revert back to the initial screen 500. After the user has selected the desired cake size from the size-selection screen 520, the user may select the next button 540A in the process flow, which directs the user to a frame-selection screen 540 (described below).

Figure 24C:
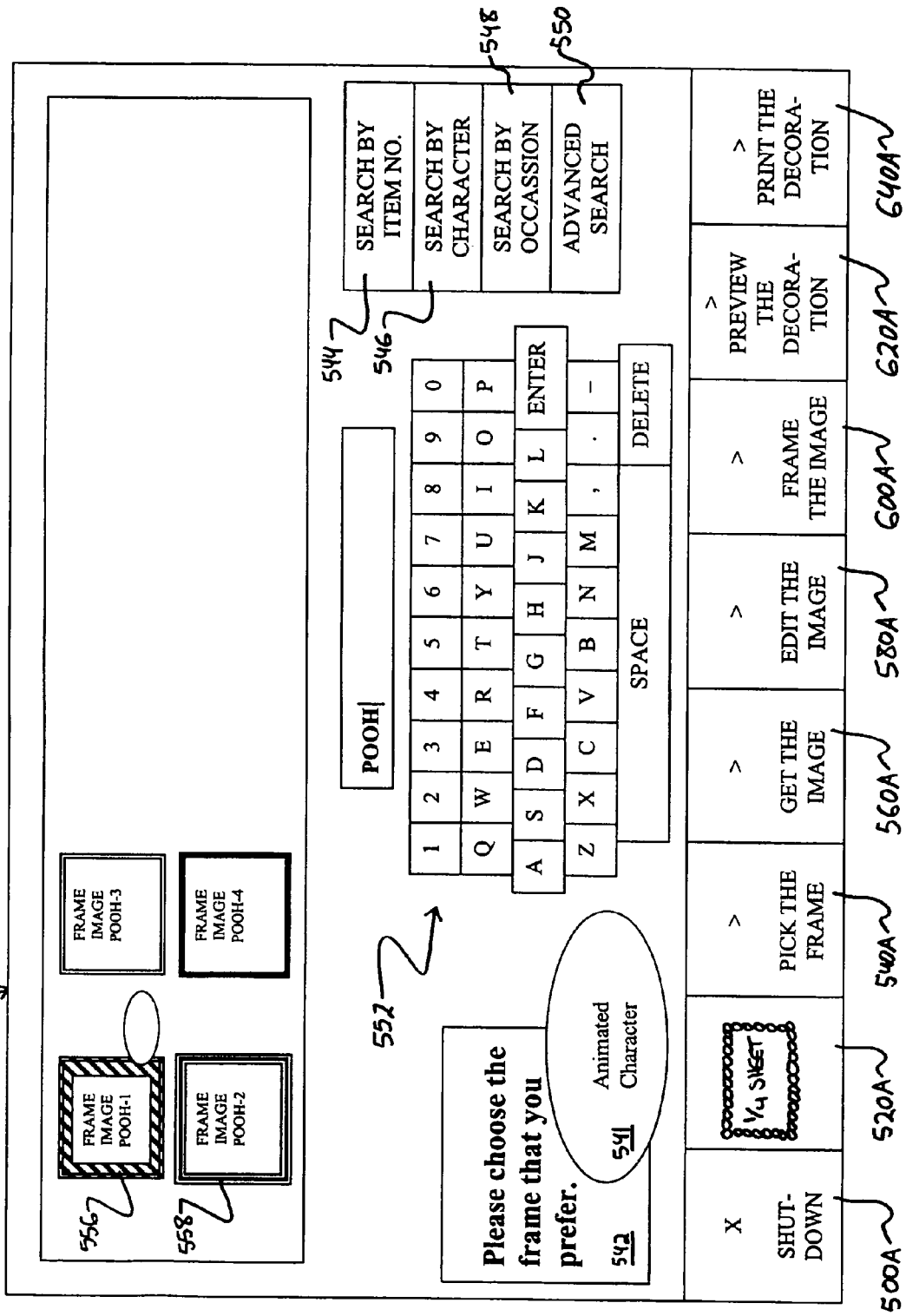

Referring to FIG. 24C, after the user selected the pick-the-frame button 540A (from the size-selection screen 520 in FIG. 24B) to continue in the process flow, the display device 430 shows a frame-selection screen 540: Because the size-selection process was completed, the appearance of the pick-the-size button 520A has changed from a ">" symbol (as shown in FIG. 24B) to a visual representation of the selected cake size (as shown in FIG. 24C). Thus, by a quick glance to the process flow buttons, the user is able to review the options that were selected in the previous steps and to view the steps that have yet to be completed.

The frame-selection screen 540 provides the user with an opportunity to select a frame decoration that will be combined with an image. The frame-selection screen 540 includes search-method buttons 544, 546, 548, and 550 to select the desired method of searching. In this embodiment, the user may search for a desired frame by typing a particular item number (obtained from a separate book or catalogue), by searching through a list of characters (e.g., cartoon characters, famous athletes, or the like), by searching through a list of special occasions (e.g., anniversary, birthday, or the like), or by typing a keyword. In any search method where the user must input letters or numbers, the display device 430 may show a virtual keyboard 552 or number pad such that the user may contact the touchscreen in proximity to the desired letter or number. When a keyword is typed (or a special occasion or character is selected from a list), one or more mini-frame buttons (e.g., buttons 556 and 558) that fit within the search criteria are displayed to the user. In this example, the user has entered the word "POOH" into the keyword search field, and all of the frames that include WINNIE THE POOH characters are displayed on the frame-selection screen 540. Continuing with this example, the user selects the mini-frame button 556 and then selects the next button 560A in the process flow, which directs the user to an image-selection screen 560).

Figure 24D:
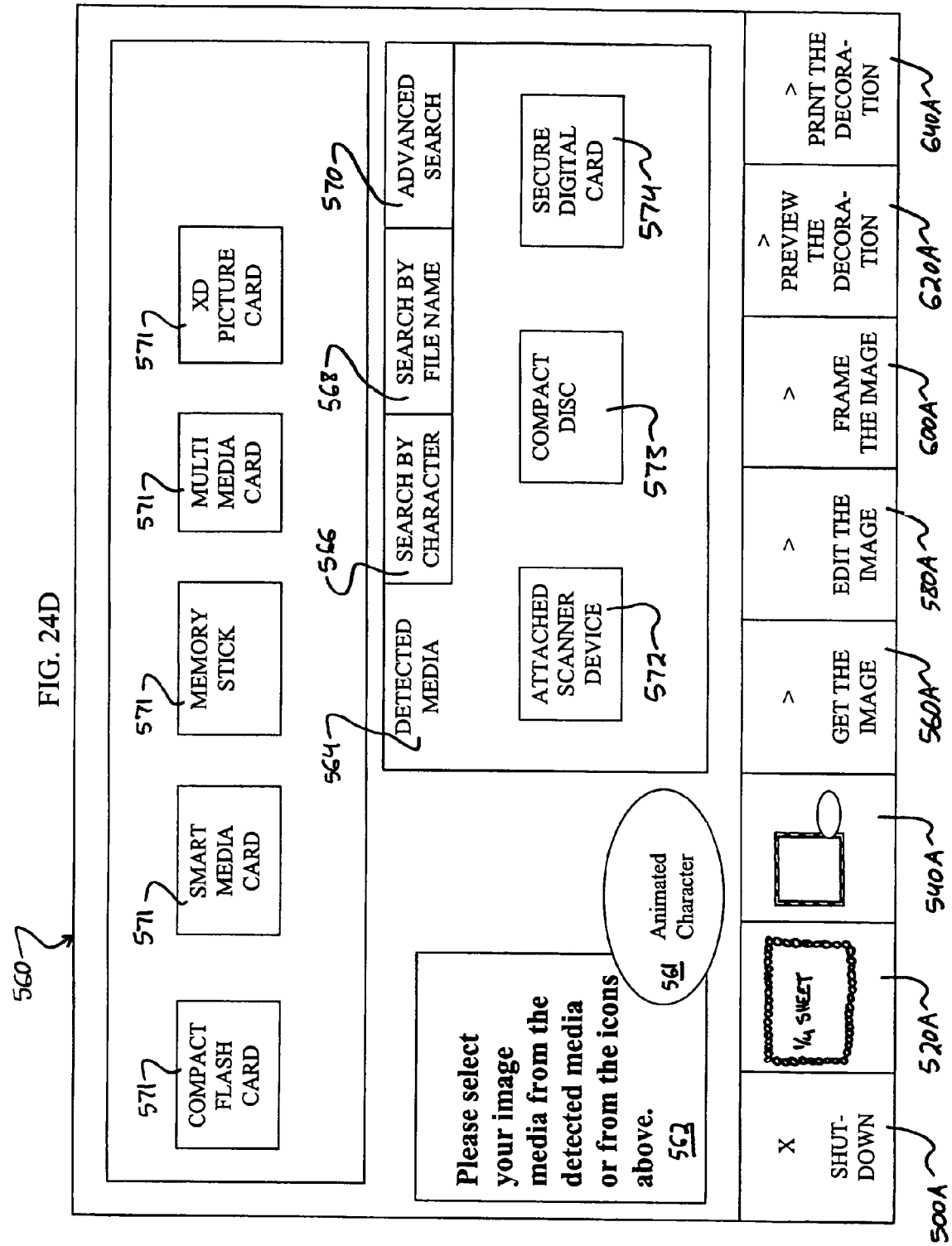

Referring to FIG. 24D, the image-selection screen 560 prompts the user to input the desired image source from which the primary unit 410 will display the desired electronic image. Because the frame-selection process was completed, the appearance of the pick-the-frame button 540A has changed from a ">" symbol to a visual representation of the selected frame. After a quick glance to the process flow buttons, the user is able to review the options selected in the previous steps and to view the steps that have yet to be completed. If, for some reason, the user desired to alter the previously selected cake size, the user may press the corresponding process flow button 520A to revert to the size-selection screen 520 (FIG. 24B) and continue from that point in the process. Similarly, if the user desired to change the previous frame selection, the user may press the corresponding process flow button 540A to revert back to the frame-selection screen 540. If the user wanted to abort the process and completely start the process over, the user may press the cancel button 500A to revert to the initial screen 500. Such options to revert back to previous steps in the process flow are available to the user at all or most steps in the process.

The image-selection screen 560 provides the user with an opportunity select the image source from which the desired image will be or has been recorded. One of several buttons 564, 566, 568, and 570 may be selected by the user to narrow the fields of searching. When the folder-search button 566 or file-search button 568 is selected, the user may type in letters or numbers on a virtual keyboard (similar to the one described above in connection with FIG. 24C) to find the desired image. For example, the image may be a particular artwork stored in a digital library in the memory 418 of the primary unit 410, and the user may search for that file by name or by folder location. When the detected-media button 564 is selected, visual representations of image sources (e.g., the scanner device 470, the disc reader 450, and the memory card reader 460) that are detected by the primary unit 410 are displayed to the user. As shown in FIG. 24D, these visual representations are buttons 572, 573, and 574 that may be selected by the user depending on the type of image the user desires. If, for example, the user has a CD or a DVD containing digital photographs, the user may select button 573 to prompt the primary unit to search for image files on the disc (using the disc reader 450). The user may search for the image files on the disc by selecting the file name from a list or by selecting a thumbnail version of the desired image that is shown on the screen. A similar process may occur when the user selects button 574 to search for image files on a memory card (using the memory card reader 460). The source-section screen 560 may also include buttons 571 that show alternative types of memory cards readable by the memory card reader 460. Selection of one of these buttons 571 would prompt the primary unit to search for image files on the particular memory card. When the desired image is found and selected from the digital library, the disc, or the memory card, the user may press the next button 580A in the process flow to proceed to the image-edit screen 580 (FIG. 24G).

Figure 24E:
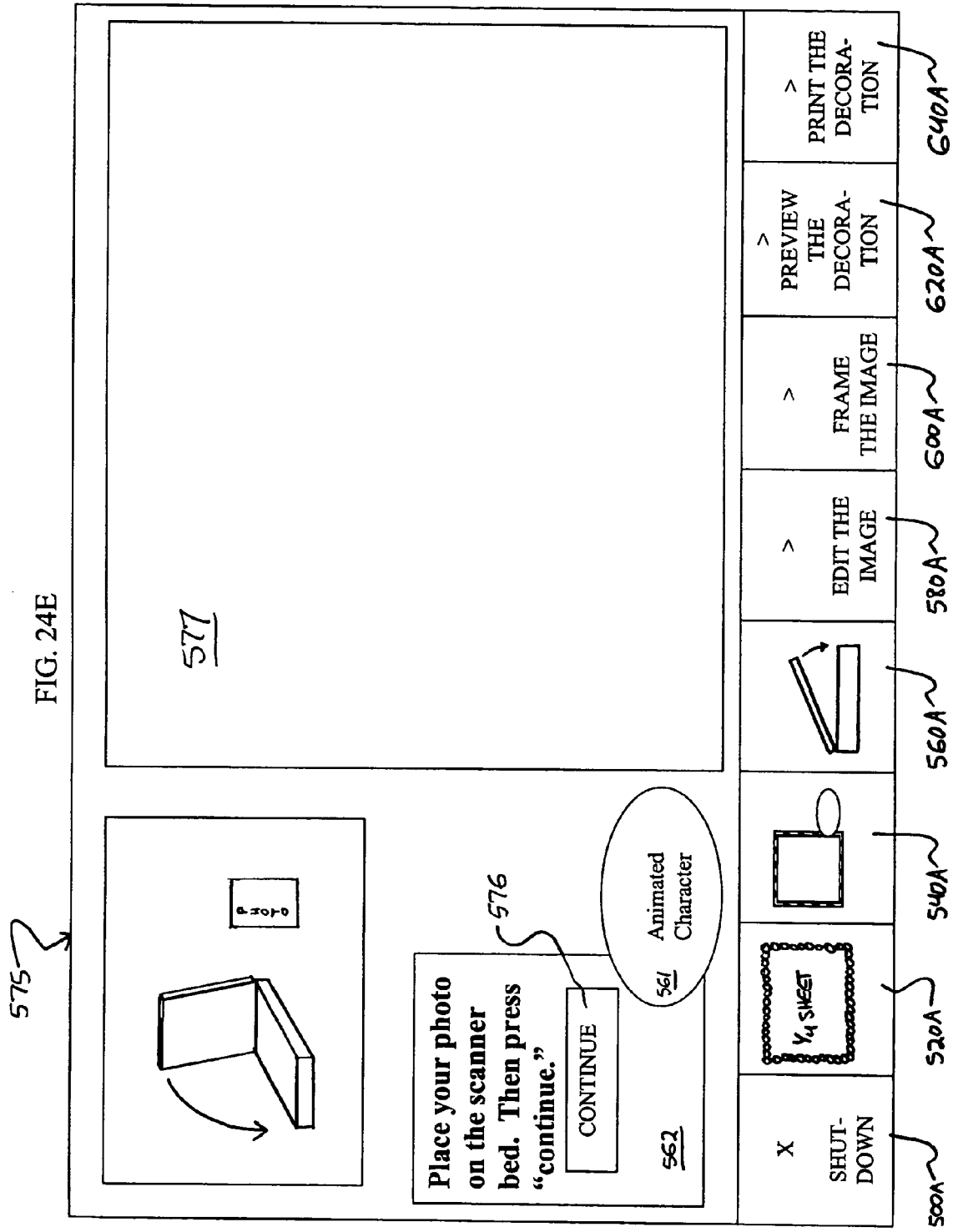

Alternatively, if the user selected the scanner button 572 (in FIG. 24D) to scan an image from a photograph using the scanner device 470, the image-selection screen would change to a scanning-preview screen 575. Referring now to FIGS. 24E-F, the scanning-preview screen 575 provides the user with an opportunity to properly position the photograph in the scanner device 470 before pressing the scan button 576. When the user presses the scan button 576, the scanned image is displayed in preview area 577 (FIG. 24F shows a partially scanned image in the preview area 577 as the photograph is being scanned). If the user is unsatisfied with the scanned image (e.g., photograph was in a tilted position in the scanner device), the user may correct the problem and press the scan button 576 again. When the user is satisfied with the scanned image shown in the preview area 577, the user may press the next button 580A in the process flow to proceed to the image-edit screen 580.

Figure 24G:
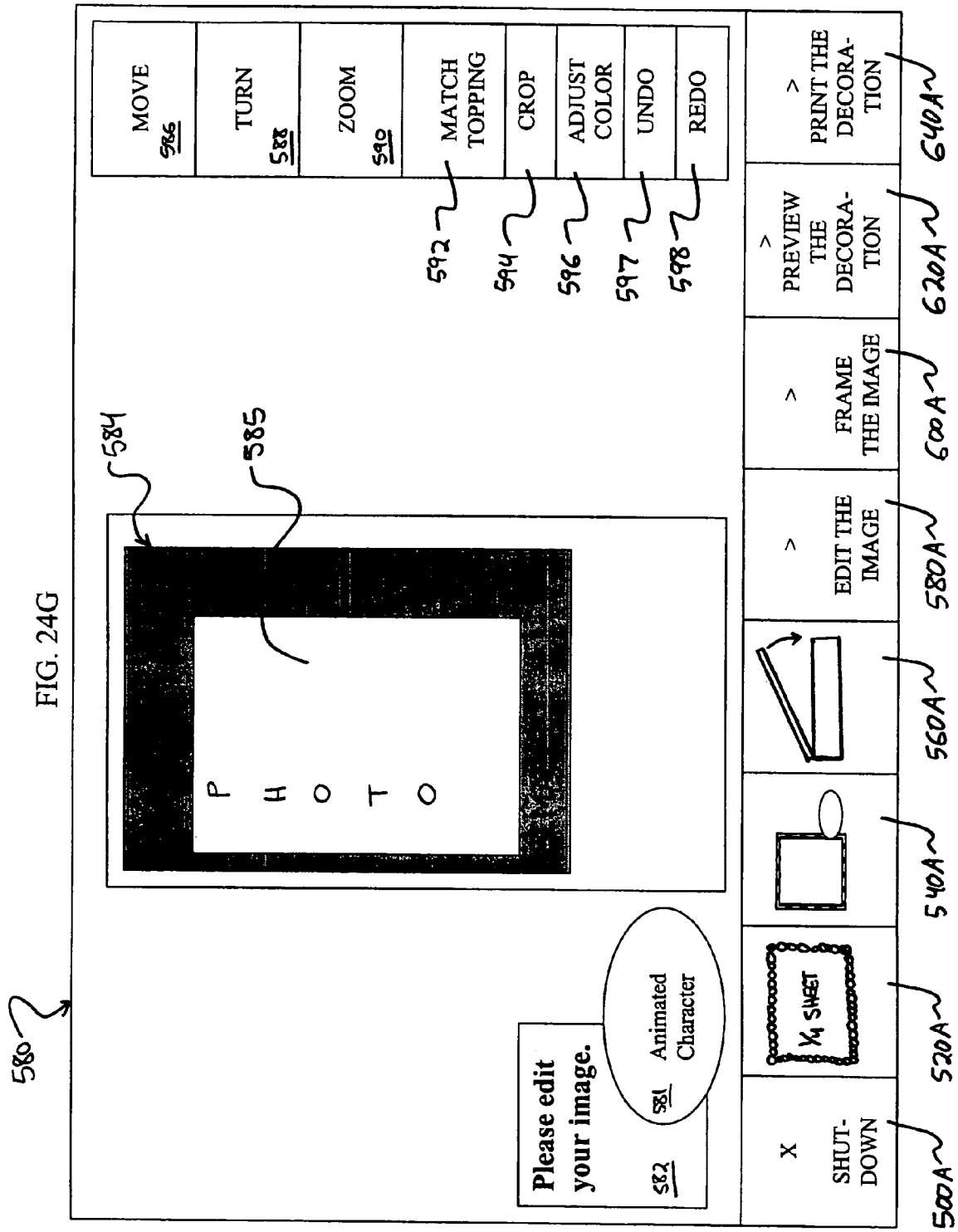

Referring now to FIG. 24G, the image-edit screen 580A provides the user with an opportunity to perform various editing functions, such as edit, rotate, crop, or color adjust. The image 584 that was scanned or selected during the image-selection process (refer to FIGS. 24D-F) is displayed to the user in the image-edit screen. Continuing with the previous example, the image 584 shown in FIG. 24G is the photographic image that was scanned by the user using the scanning device 470. Because the user intends to combine the image 584 with a previously selected frame (represented by button 556 in FIG. 24C), a match-topping button 592 may be pressed to show a viewable area 585 that fits within the frame. Any shaded area located outside the viewable area 585 on the image 584 would be covered by the printed frame decoration, so the user may press the apply-crop button 594 to delete the shaded area from the image 584. Alternatively, the user may crop an area slightly larger than the viewable area 585, which would provide the user with an opportunity to adjust the position of the image 584 when combined with the frame (described in more detail below). If the image 584 was not going to be combined with the frame decoration, the match-topping button 592 could create a different viewable area that matches the outer perimeter of the cake topping (e.g., create an 7-inch circle as the viewable area when the user intends to apply the final image to an 8-inch round cake). Again, the apply-crop button 492 could then be pressed to delete the shaded area such that the remaining portion of the image 584 matches the perimeter of the cake topping.

Still referring to FIG. 24G, the move button 586 may be used to move the viewable area 585 with respect to the image 584. For example, the user may press the move button 586 and then press the touchscreen 420 over the viewable area 585 and "drag" the viewable area up, down, left, or right relative to the image 584. Also, the turn button 588 operates to rotate the image 584 with relative to the viewable area 585. For example, the user may press the turn button 588 to rotate the image 584 90° in the clockwise direction relative to the viewable area 585. The zoom button 590 permits the user to enlarge or reduce the size of the image 584 with respect to the viewable area 585. In such a case, the user may wish to enlarge the image 584 so that the person's face substantially fills the viewable area 585.

All of these editing buttons 586, 588, 590, 592, 594, 596, and others may open a subset of buttons when initially pressed. For example, when the turn button 588 is initially pressed, the area on the screen 580 occupied by the turn button 588 may convert into a set of smaller buttons that permit the user to select the direction and amount of rotation. In another example, when the user initially presses the adjust-color button 596, a set of smaller buttons may appear that permit the user to adjust the contrast, tint, or shading of the image 584.

If the user wishes to "undo" and editing function applied to the image 584 or viewable area 585, the user may select the undo button 597, which nullifies the most recent edit applied by the user. The undo button 597 may be pressed twice to nullify the two most recent edits, and so forth. The redo button 598 may be pressed to re-apply an edit that was most recently nullified by pressing the undo button 597. After the user is sufficiently satisfied with the appearance of the image 584 or no longer wants to perform edits to the image 584, the user may press the next button 600A in the process flow to proceed to the frame-image screen 600.

Figure 24H:
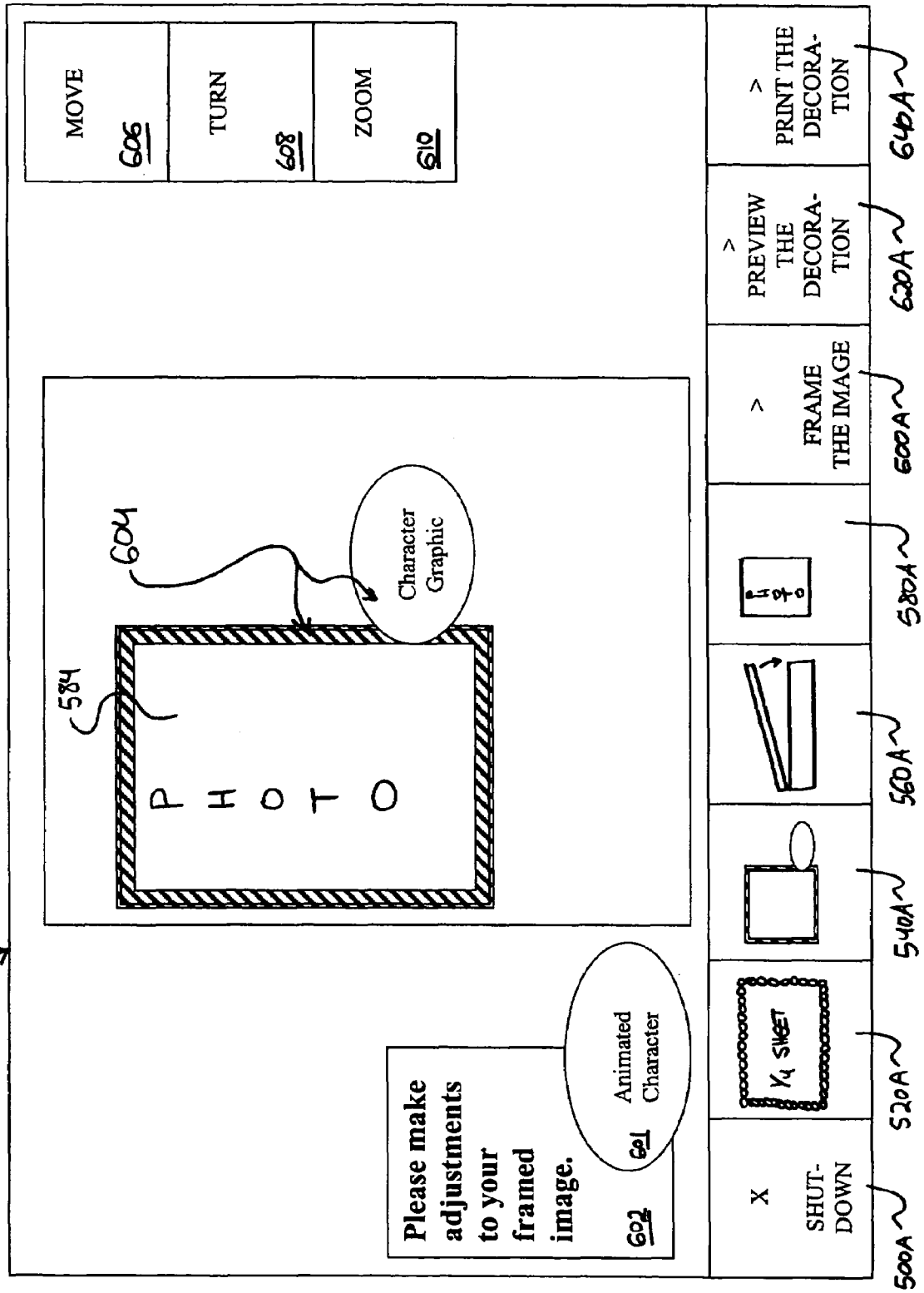

Referring to FIG. 24H, the frame-image screen 600 provides the user with an opportunity to view the combination of the edited image 584 and the previously selected frame 604. Because the image-edit process was completed, the appearance of the image-edit button 580A has changed from a ">" symbol to a visual representation of the edited image (i.e., a photographic image cropped to fit with the frame). If, for some reason, the user is unsatisfied with the image 584 as combined with the frame 604, the user may press the corresponding process flow button 580A to revert to the image-edit screen 580 (FIG. 24G) and continue from that point in the process.

The frame-image screen 600 includes a move button 606 and a turn button 608 that permit the user to adjust the position and orientation of the image 584 relative to the frame 584. The zoom button 610 provides an opportunity to view and inspect the combined image 584 and frame 604. In the example shown in FIG. 24H, the combined image 584 and frame 604 has been magnified on the screen 600 using the zoom button 610. The user may select this feature to more closely view and inspect the appearance of the combined image 584 and frame 604. Similar to the previously described editing buttons, all of these editing buttons 606, 608, 610 may open a subset of buttons when initially pressed. When the user is sufficiently satisfied with the appearance of the image 584 in combination with the frame 604, the user may press the next button 620A in the process flow to proceed to the preview screen 620.

Referring to FIG. 24I, the preview screen 620 provides the user with an opportunity to view the final image 624 on a visual representation 622 of the particular foodstuff selected during the size-selection process (refer to FIG. 24B). In the example shown in FIG. 24I, the final image 624 overlays a frosted, ¼-sheet cake, which was the particular cake size selected from the size-selection screen 520. In this embodiment, the final image 624 includes the image 584 combined with the frame 604 and customized text 623 (described in more detail below). In other embodiments where the user does not desire a frame, the final image 624 may include the image 584 without the frame 604. The frame-image process was completed, so the appearance of the frame-image button 600A has changed from a ">" symbol to a visual representation of the framed image (i.e., the image combined with the frame). If, for some reason, the user is unsatisfied with the image 584 as combined with the frame 604, the user may press the corresponding process flow button 600A to revert to the frame-image screen 600 (FIG. 24H) and continue from that point in the process. Similarly, if the user desired to further edit the image 584, the user may press the corresponding process flow button 580A to revert back to the image-edit screen 580. If the user wanted to abort the process and completely start over, the user may press the cancel button 500A to revert to the initial screen 500.

Still referring to FIG. 24I, the position button 626 permits the user to adjust the position of the final image 624 relative to the cake representation 622. For example, the user may press the position button 626 to open a subset of the buttons that cause the final image 624 to be moved up, down, left, or right relative to the cake representation 622. Similarly, the rotation button 627 may be pressed by the user to adjust the orientation of the final image 624 relative to the cake representation 622. The zoom button 628 operates to enlarge or reduce the final image 624 relative to the cake representation 622. For example, the user may press the zoom button 628 to open a subset of buttons, one of which stretches the final image 624 in the horizontal direction while the cake representation 622 remains the same size. Such features on the preview screen 620 advantageously help the user to plan the final appearance of the image 624 as applied to the actual foodstuff before printing to the edible media. If the user was unsatisfied with the final image as it appears on the cake representation 622, the user could revert back to one of the previously described screens and make any revisions. There is no need for the user to print the final image onto the edible media and apply it to a foodstuff before determining whether the appearance is satisfactory, which could potentially waste the edible media, the edible ink, and the foodstuff product.

The preview screen 620 also includes a set of buttons 630-635 that permit the user to add customized text to the final image 624. After pressing the add-text button 629, the user may press on an area of the cake representation 622 where the customized text should be positioned. A text box then appears with a virtual keyboard (similar to the one described above in connection with FIG. 24C). After typing in the desired text using the virtual keyboard, the text 623 appears on the cake representation 622. Alternatively, the user may select a particular pre-typed phrase from a list of common messages (e.g., Happy Birthday, Good Luck, and the like) positioned next to the virtual keyboard. If the user wishes to delete the previous added text, the user may press the delete-text button 630 and then press on the newly added text box.

Still referring to FIG. 24I, the user may customize the text 623 such that it follows an arcuate path by pressing either button 631 or button 632 and then pressing the area in proximity to the newly added text box to which the arcuate path may pass through. Such a feature may be useful when the image will be applied to a round cake. Also, the font button 633 may be pressed to provide the user with a list of text fonts, one of which may be selected to change the font of the added text 623. Similarly, the color of the text 623 may be changed by pressing the color button 634, which permits the user select from various different text colors. The user may amend the textual message that was previously added by pressing the edit-text button 635 then pressing the text 623, which causes the virtual keyboard to be shown along with previous entered text and a cursor. The undo button 637 and the redo button 638 perform functions similar to those previously described in connection with FIG. 24G. When the user is sufficiently satisfied with the preview of the final image 624 on the cake representation 622, the user may press the next button 640A in the process flow to proceed to the print-image screen 640.

Figure 24J:
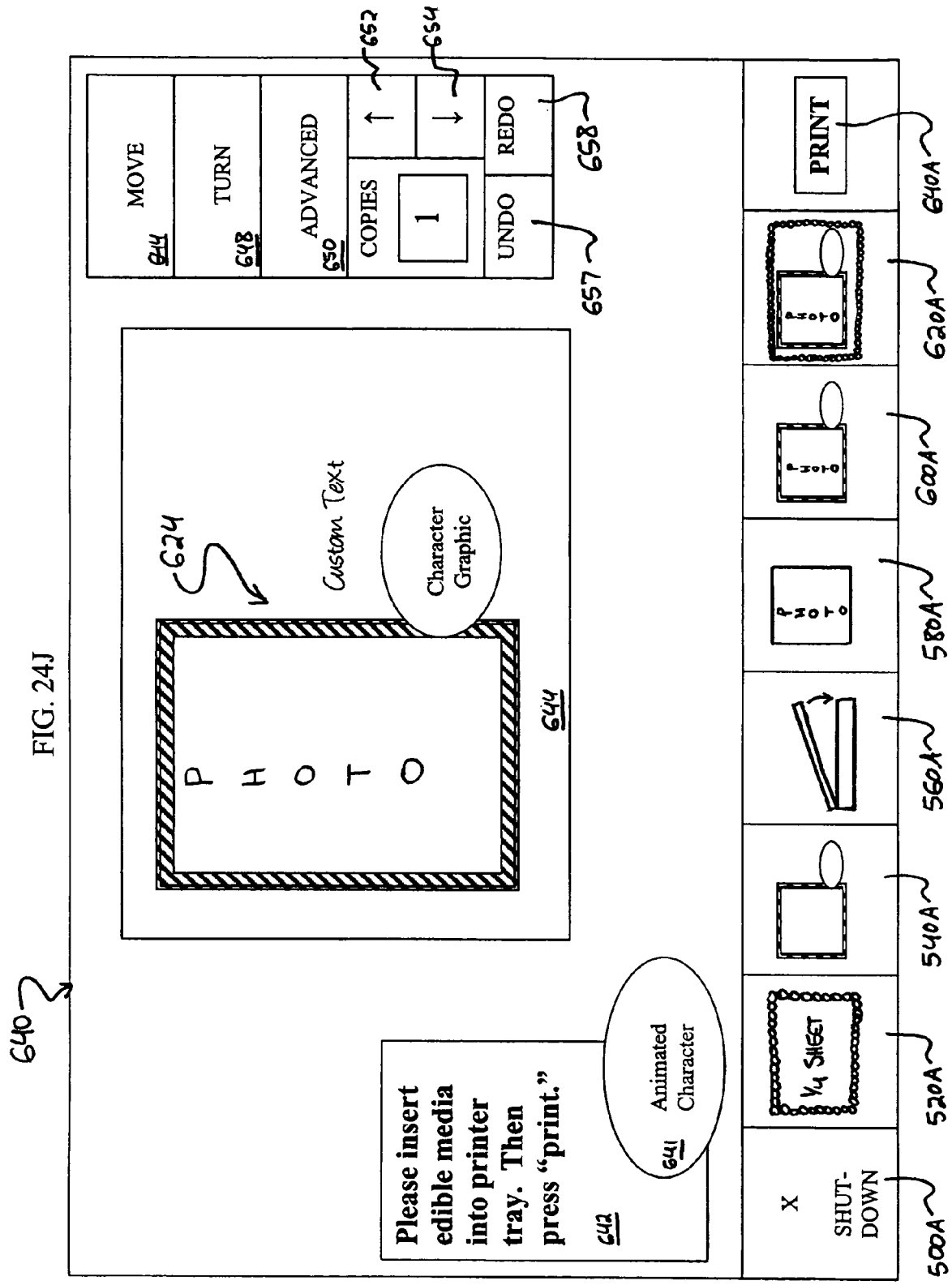

Referring now to FIG. 24J, the print-image screen 640 provides the user with an opportunity to properly load the edible media 482 into the printing device 480 before the printing starts. The print-image screen 640 may include an animated character 641, a dialogue box 642, or both to provide helpful information and instructions. The final image 624 is shown on a visual representation 644 of an edible media sheet, thus providing the user with a final "print preview." The move button 646 may be pressed by the user to change the position of the final image 624 relative to the edible media representation 644. Similarly, the turn button 648 permits the user to change the orientation of the final image 624 relative to the edible media representation 644. The advanced-options button 650 opens a submenu of various printing options, such as the print quality or black-and-white printing. The user may also select the number of copies to be printed. To increase the number of requested copies, the user may press the increase-number button 652. Likewise, the decrease-number button 654 decreases the number of copies that will be printed by the printing device 480. The undo button 657 and the redo button 658 perform functions similar to those previously described in connection with FIG. 24G. When the user is sufficiently satisfied with the preview of the final image 624 and the print options, the user may press the print-image button 640A, which causes the primary unit 410 to transmit printer control signals to the printer device 480 such that the image 624 may be printed to the edible media 482. As a result, the user is provided with a high quality, printed image on a piece of edible media, which in turn may be applied to a foodstuff for decorating purposes.

It should be understood that operation of the processing unit 411 is not limited to the process flow example previously described in connection with FIGS. 24A-J. Rather, other screens (that follow different process flows) may be displayed to print a desired image to a sheet of edible media. Furthermore, one or more of the previously described screens may be excluded altogether. For example, if the user intends to print a scanned image without a frame decoration, the user may press the photo button 514 from the initial screen 500 (FIG. 24A) and continue through a shortened process flow. In such an embodiment, the user may be guided through several screens that function similar to the size-selection screen 520 (FIG. 24B), the image-selection screen 560 (FIG. 24D), the image-edit screen 580 (FIG. 24G), the preview screen 620 (FIG. 24I), and the print-image screen 640 (FIG. 24J).

Furthermore, the process flow described in connection with FIGS. 24A-J may be implemented on systems other than the previously described decorating systems 10 or 400. For example, the process flow and screens shown in FIGS. 24A-J may be implemented using a software program product operating on a personal computer system, a business workstation, or a network server.

The edible media does not necessarily include a release sheet while being guided through the printer device. As previously described in connection with FIGS. 19-20, some embodiments of the edible media 300 may include a release sheet 310, an edible layer 320, and a coating 330. While the release sheet may be used during manufacturing and shipping, the release sheet may be removed from the edible layer before the edible layer is guided through the printer device. Alternatively, the edible layer may be shipped to the user without any release sheet attached thereto. In either case, the edible media may be formulated to have sufficient strength to be guided through the conveying path of the printer device, yet the edible media should not be overly thick to jam in the printer mechanism. One suitable example of such edible media adapted to be printed upon without the use of a release sheet includes DECOPAC PRINTABLES #973 supplied by DECOPAC, INC. of Minneapolis, Minn. These sheets of edible media have thickness of about 0.025" to about 0.035" (preferably about 0.030" thick) and comprise sugar, sorbitol, hydrogenated palm kernel oil, xanthan gum, locust bean gum, gum tragacanth, dried glucose syrup, and water. Another suitable example of and edible media adapted to be printed upon with the use of a release sheet includes FROSTING SHEETS lot number #25303 supplied by KOPYKAKE, INC. of Torrance, Calif. These sheets have a thickness of about 0.013" to about 0.018" (preferably about 0.015" thick) and comprise water, cornstarch, corn syrup, corn syrup solids, cellulose, sorbitol, sugar, vegetable oil, Arabic gum, polysorbate 80, and citric acid. Both the DECOPAC PRINTABLES and the FROSTING SHEETS are capable of undergoing an inkjet printing process without the use of a release sheet.

Figure 25:
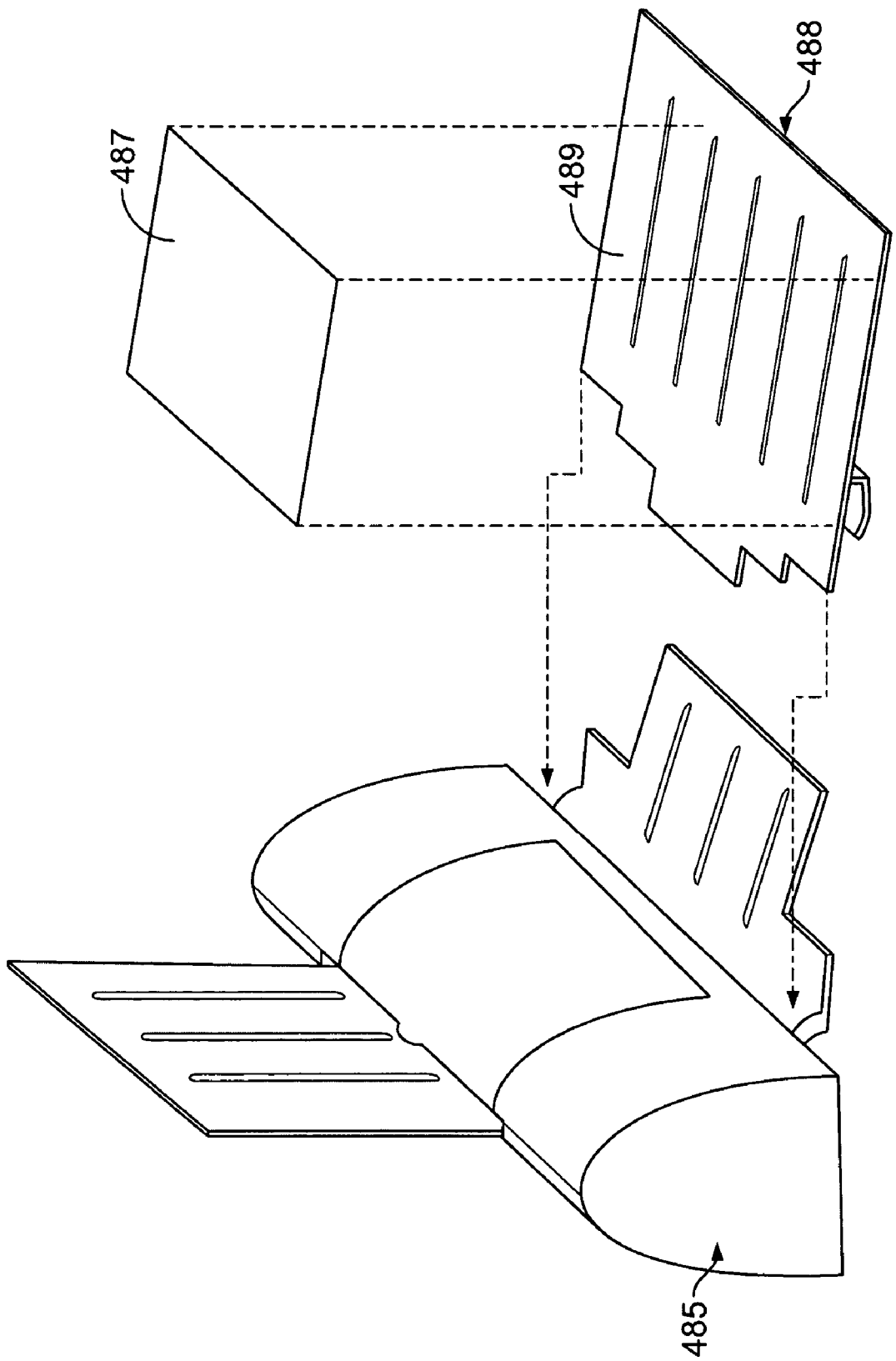
FIG. 25 is an exploded view of a receiving tray and a printer device of FIG. 21.

Referring to FIG. 25, the printer device 480 (and/or 485) may be configured to receive edible media having no release sheet. In some instances, the printer device may include a customized receiving tray 488 for receiving the edible media. As previously described, one suitable printer device 480 for printing to edible media 482 includes a CANON i560 and another suitable device 485 for printing to large-format edible media 487 includes a CANON i9100 printer. These printers—and other similar devices—may include a paper-receiving tray that does not physically support the outer edges of the edible media 482 or 487 that is loaded thereon. In such circumstances, a receiving tray 488 that includes an enlarged support area 489 may be connected to the printer device so as to maintain the edible media in the proper posture when the printing commences. As shown in FIG. 25, the support area 489 is wider and taller than the large-format edible media 487 so that the outer edges of the edible media 487 do not bend or droop when placed upon the receiving tray 488. Although the printer device depicted in FIG. 25 is a large-format printer device 485, an appropriately sized receiving tray having sufficient support area may be similarly connected to printer device 480.

Figure 26:
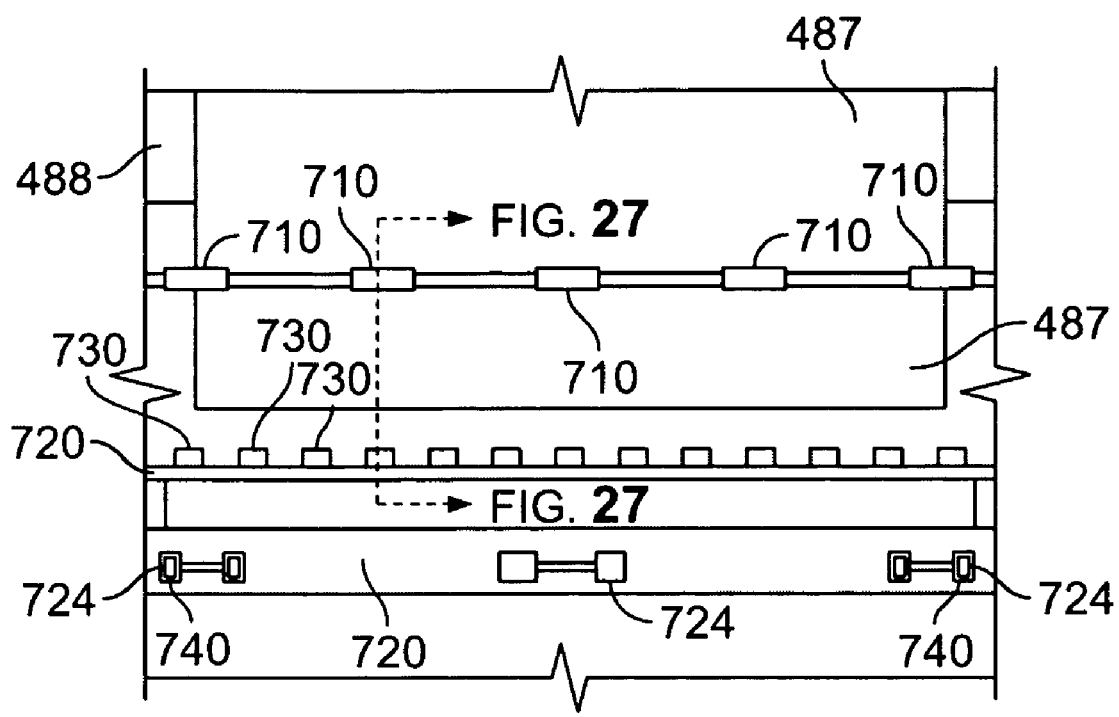
FIG. 26 is a top view of a conveying path in a printer device of FIG. 21.
Figure 27:
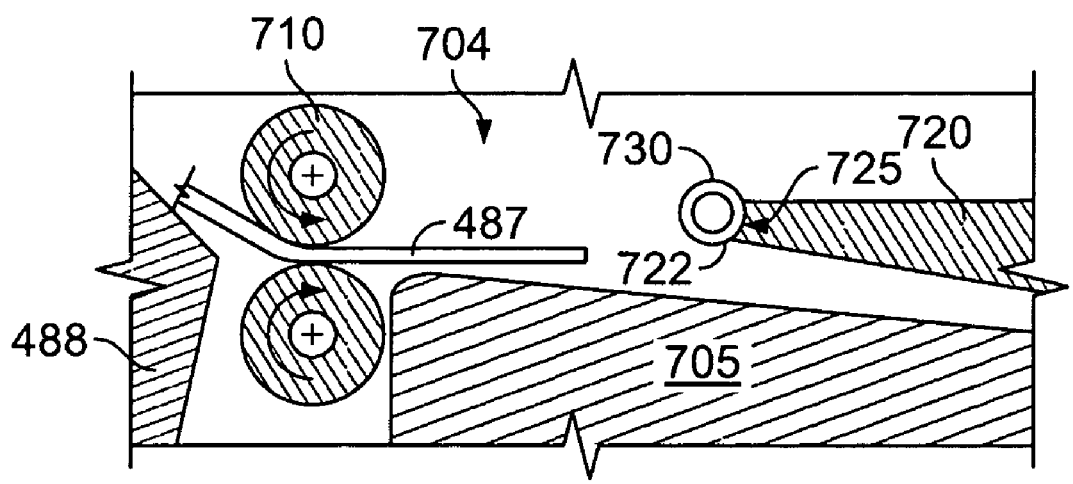
FIG. 27 is a partial cross-section view of the conveying path of FIG. 26.

Referring to FIGS. 26-27, the conveying path of the printer device may be configured to guide edible media having no release sheet. Drive rollers 710 rotate to move the edible media 487 having no release sheet from the receiving tray 488 into the conveying path of the printer device 485. The edible ink is deposited onto the edible media 487 in the portion 704 of the conveying path between the roller 710 and the guide member 720. Unlike some traditional paper media, the edible media 487 may develop an elastic memory from the force of the driver rollers 720, which in turn causes the edible media 487 to slightly bend upward toward the front face 722 of the guide member 720. One or more arcuate members 730 may be coupled to the guide member 720 so as to prevent the leading edge of the edible media 487 from abutting the front face 722. Thus, the leading edge of the edible media 487 may be passed between guide member 720 and the bottom guide member 705 with no blockage or jam in the printing process. In this embodiment, the arcuate member 730 is coupled to the guide member by inserting a portion of the arcuate member into a slot 725, but the arcuate member 730 may be couple to the guide member 720 using any type of adhesive, friction fit, or the like.

Other optional configurations of the printer device may include the removal of some components from the guide member 720. The extent of such modifications may depend on the thickness of the edible media 487 that is passing through the printer device. In some embodiments, one or more guide rollers 740 may be removed from the roller cavities 724 in the guide member 720 to prevent unwanted smudging of the edible ink as the edible media 487 passes under the guide member 720. As shown in FIG. 26, for example, the outer-most guide rollers 740 remain connected to the guide member 720 while the central roller has been removed. In another embodiment, a zinc-coated metal plate that is traditionally connected to the guide member 720 may be removed to provide sufficient clearance for the edible media 487. Alternatively, the position of the guide member 720 may be elevated by placing spacers between the guide member 720 and the bottom guide member 705 at the side edges (i.e. where the spacers do not interfere with the path of the edible media). When the spacers slightly elevate the guide member 720, the leading edge of the edible media 487 is unlikely to abut the front face 722, thus reducing the likelihood of blockage in the printer device. It should be understood that although the printer device depicted in FIGS. 26-27 is a large-format printer device 485, similar adjustments may be made to the printer device 480 to improve the process of printing onto regular-format edible media 482 having no release sheet.

A number of embodiments of the invention have been described. Nevertheless, it will be understood that various modifications may be made without departing from the spirit and scope of the invention. Accordingly, other embodiments are within the scope of the following claims.

What is claimed is:

1. A system for decorating an edible substrate, comprising:
   a primary housing containing a processing unit;
   a first display device coupled to the processing unit;
   a scanner coupled to the processing unit, the scanner being operable to scan an image and transmit the image to the processing unit;
   a printer device connected to the processing unit, the printer device being operable to print the image onto an edible substrate; and
   a second display device coupled to the processing unit, the second display device being remotely positioned relative to the primary housing and being operable to display at least a portion of the image displayed on the first display device.

2. The system of claim 1, wherein the processing unit is operable to selectively transmit an advertising message to the second display device.

3. The system of claim 2, wherein the primary housing further includes a network interface to access data from a remote server.

4. The system of claim 3, wherein the data from a remote server comprises images, technical support information, or tutorial information.

5. The system of claim 1, wherein the first display device is contained within the primary housing.

6. The system of claim 1, further comprising a third display device coupled to the processing unit, the third display device being remotely positioned relative to the primary housing.

7. The system of claim 5, further comprising a touchscreen device positioned over the first display device.

8. The system of claim 1, wherein the primary housing further contains an audio device coupled to the processing unit.

9. The system of claim 1, wherein the primary housing further contains a DVD reader.

10. The system of claim 1, wherein the primary housing further contains a non-volatile memory reader.

11. The system of claim 10, wherein the non-volatile memory reader is adapted to receive flash memory cards.

12. The system of claim 1, wherein the processing unit executes instructions associated with a LINUX operating system.

13. The system of claim 12, further comprising a long-term memory device having stored thereon custom device drivers associated with a LINUX operating system.

14. The system of claim 13, wherein the processing unit causes a visual notification to be displayed on said first display device, the visual notification being associated with printer maintenance.

15. The system of claim 1, wherein the edible substrate is a substantially contiguous, integral layer of an edible composition comprising sugar.

16. The system of claim 15, wherein the layer of an edible composition has a planar face and the printer device includes a tray adapted to support substantially the entire planar face.

* * * * *